(12) United States Patent
De Jong

(10) Patent No.: US 6,267,401 B1
(45) Date of Patent: Jul. 31, 2001

(54) FOLDABLE BICYCLE

(75) Inventor: Dirk-Koen De Jong, Amsterdam (NL)

(73) Assignee: Urban Solutions B.V., Amsterdam (NL)

( * ) Notice: Subject to any disclaimer, the term of this patent is extended or adjusted under 35 U.S.C. 154(b) by 0 days.

(21) Appl. No.: 09/463,287

(22) PCT Filed: Jul. 21, 1998

(86) PCT No.: PCT/NL98/00416

§ 371 Date: Apr. 10, 2000

§ 102(e) Date: Apr. 10, 2000

(87) PCT Pub. No.: WO99/05021

PCT Pub. Date: Feb. 4, 1999

(30) Foreign Application Priority Data

Jul. 21, 1997 (NL) .................................................. 1006637

(51) Int. Cl.[7] .................................................. B62K 15/00
(52) U.S. Cl. .......................................................... 280/287
(58) Field of Search ................................. 280/281.1, 287, 280/288.3

(56) References Cited

U.S. PATENT DOCUMENTS 4,598,923 * 7/1986 Csizmadia ........................... 280/287
5,947,500 * 9/1999 McGrane ............................. 280/287

FOREIGN PATENT DOCUMENTS

| 4423647   | 1/1996  | (DE) . |
| 196 36 900 | 4/1997  | (DE) . |
| 0404017   | 12/1990 | (EP) . |
| 93 21055  | 11/1993 | (WO) . |

* cited by examiner

*Primary Examiner*—Kevin Hurley
(74) *Attorney, Agent, or Firm*—Kinney & Lange, P.A.

(57) ABSTRACT

A foldable bicycle (1) includes a frame (100) subdivided into two frame halves (144, 145); frame-coupling means (300) intercoupling the two frame haves (144, 145), enabling those two frame halves (144, 145) to pivot relative to each other about a substantially vertical pivotal axis (143); and frame-locking means for locking the frame-coupling means (300) in an unfolded condition of the bicycle (1). According to an important aspect of the present invention, the saddle arm (110) can pivot about a substantially horizontally directed pivotal axis (201), and a forwardly directed pivotal movement of the saddle arm (110) uncouples a locking of the frame-coupling means (300) to permit a pivotal movement of the frame-coupling means (300).

24 Claims, 22 Drawing Sheets

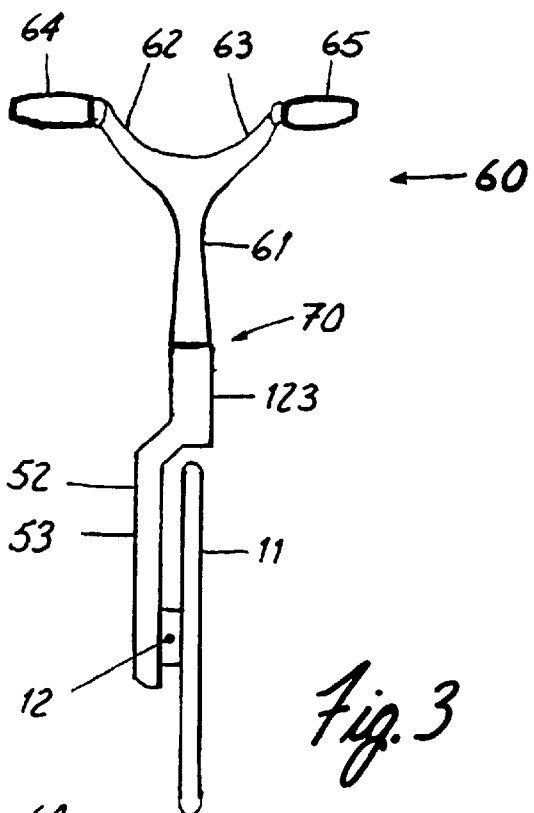
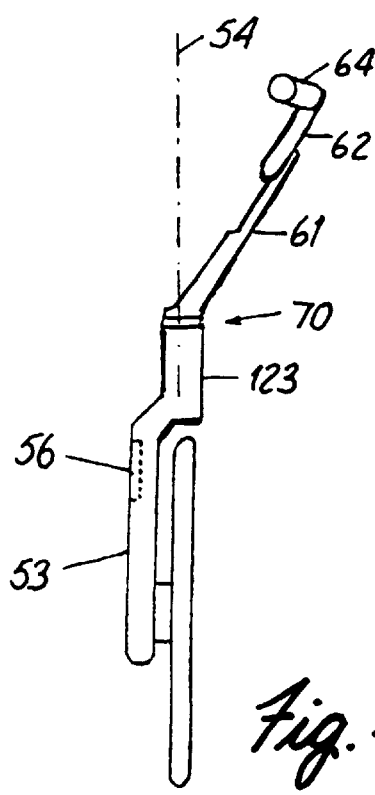
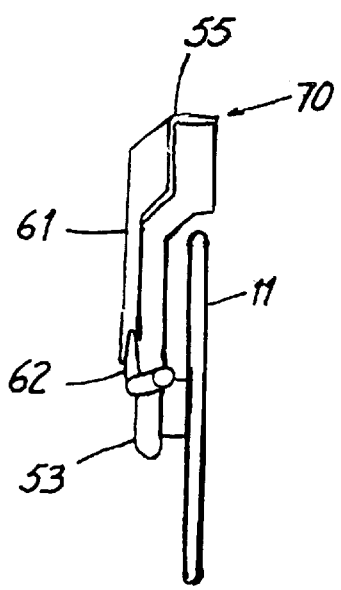
Fig. 3
Fig. 4A
Fig. 4B

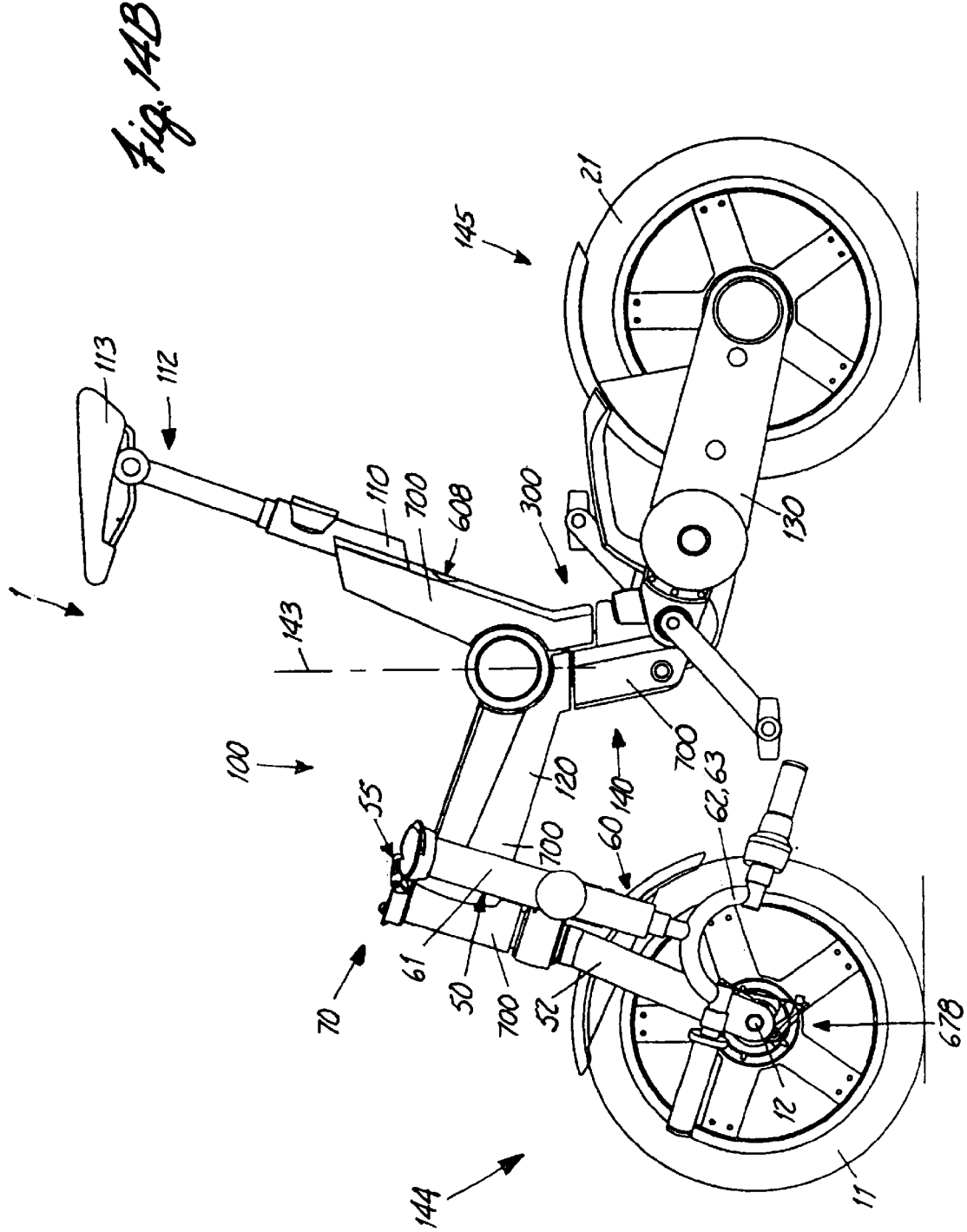

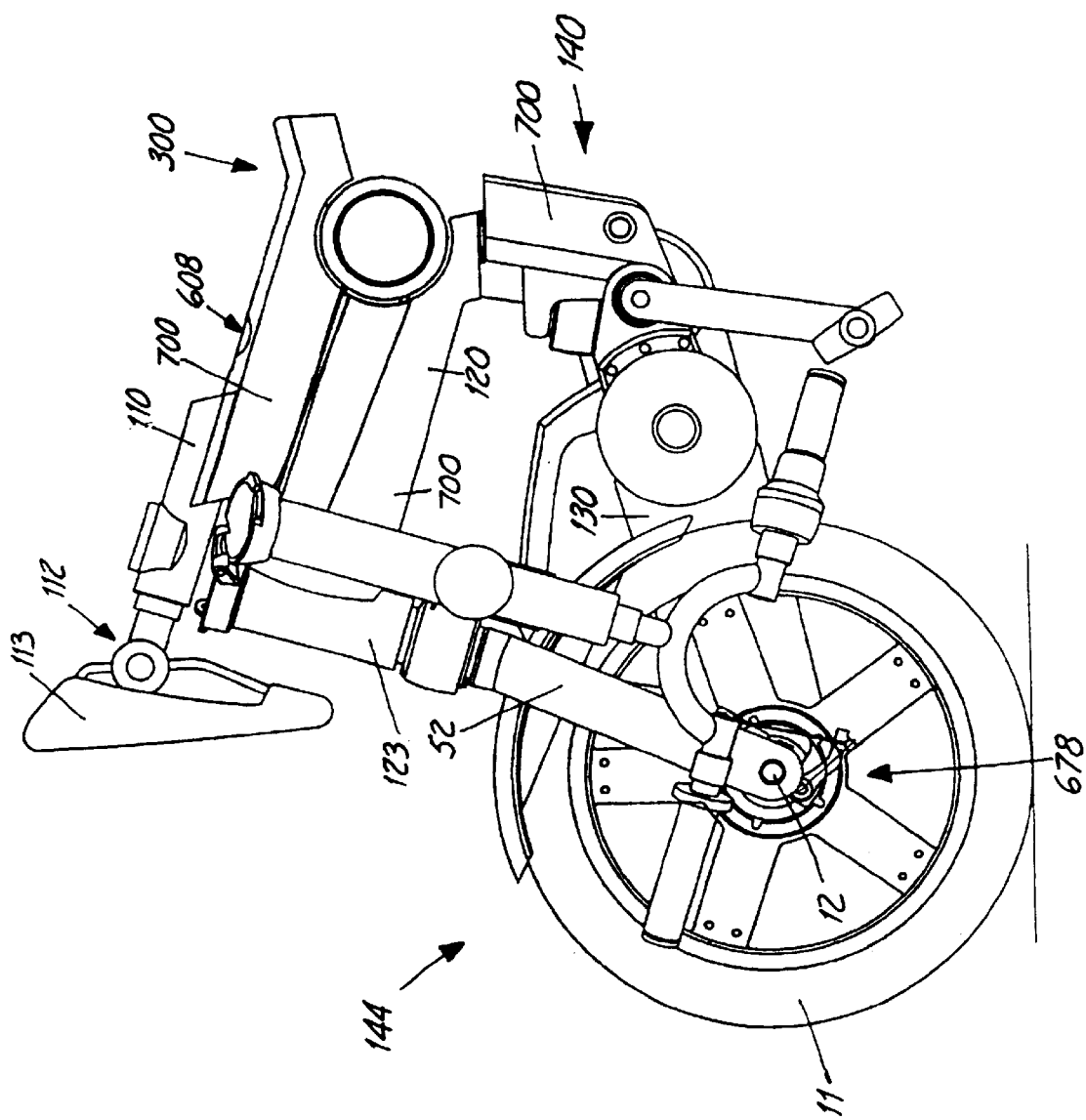

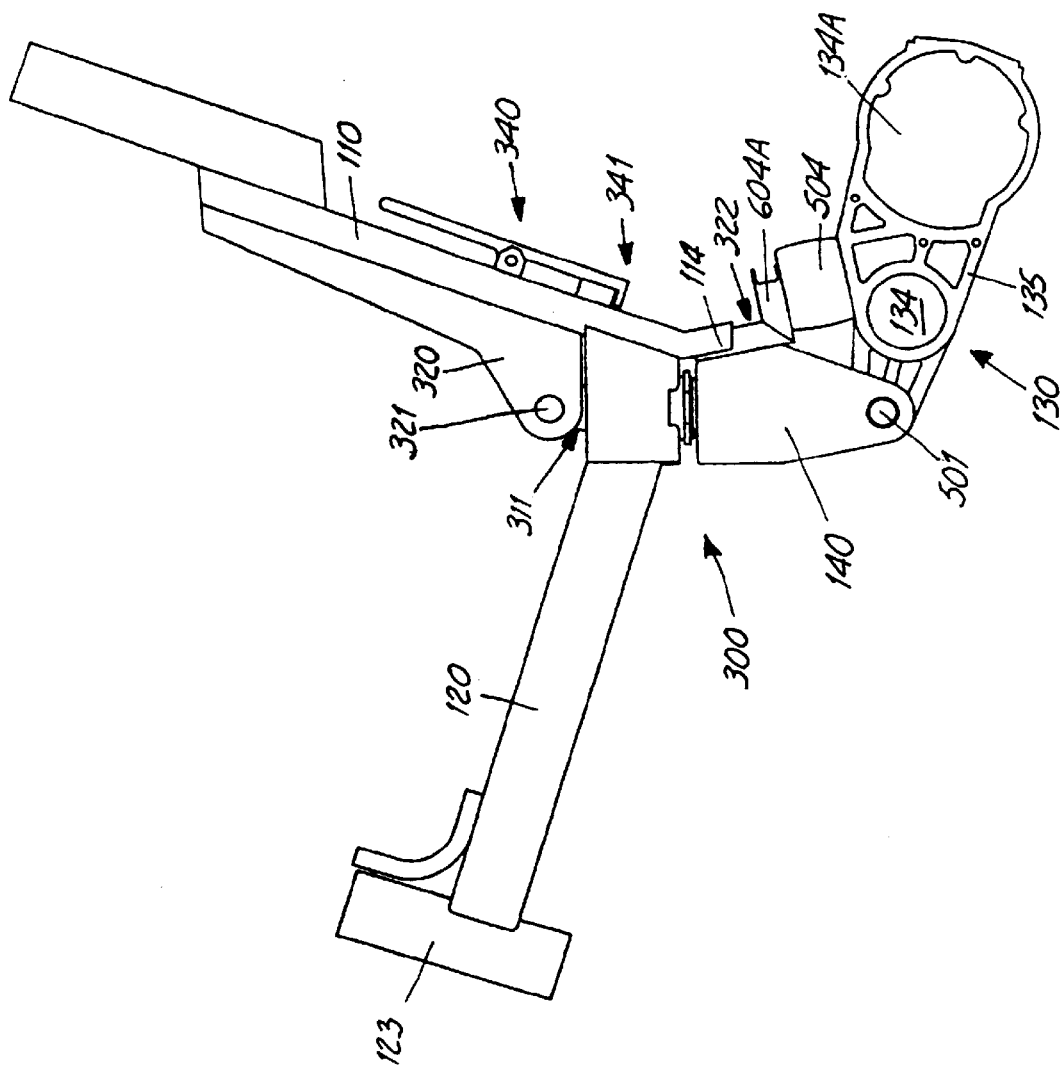

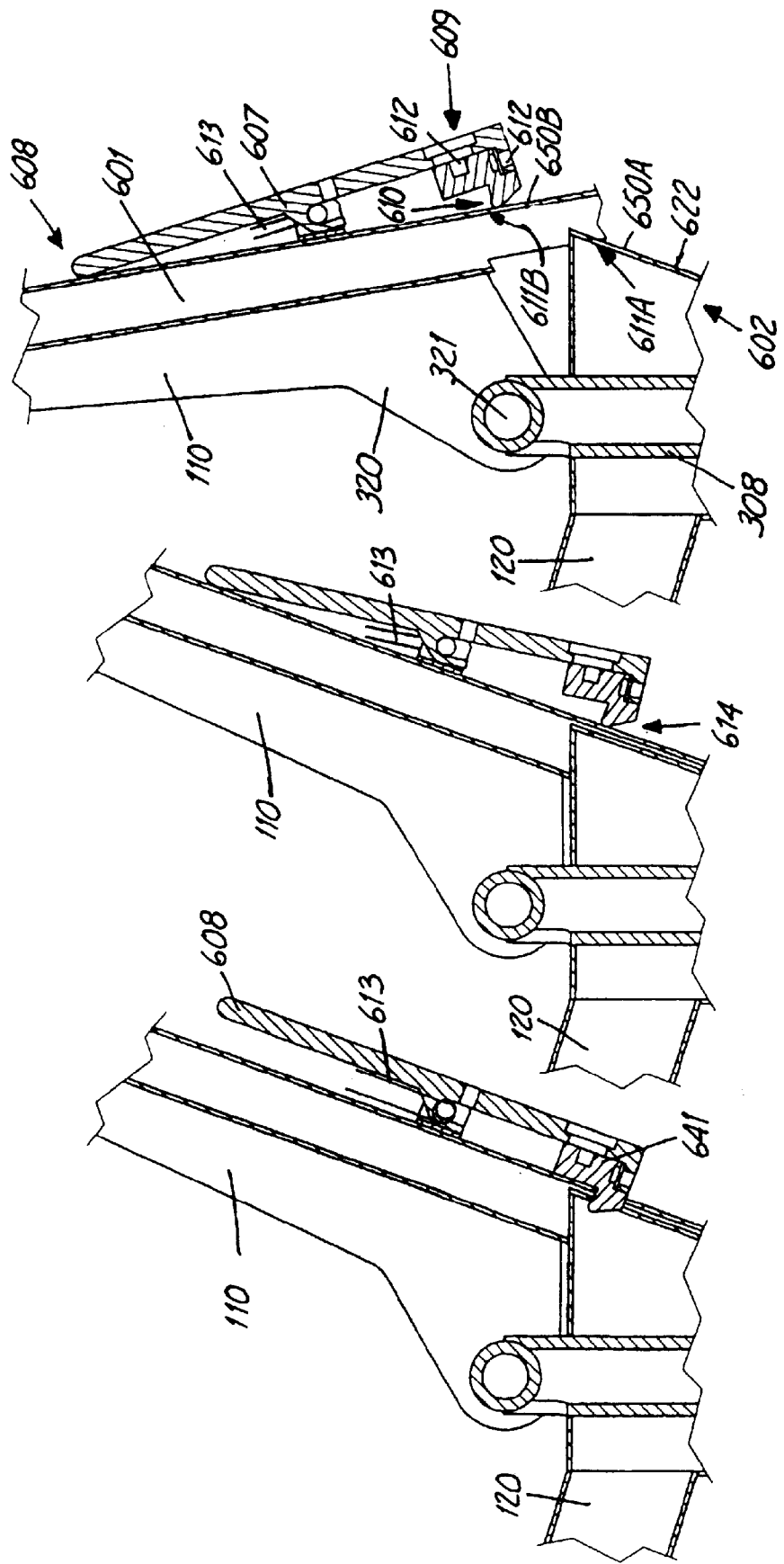

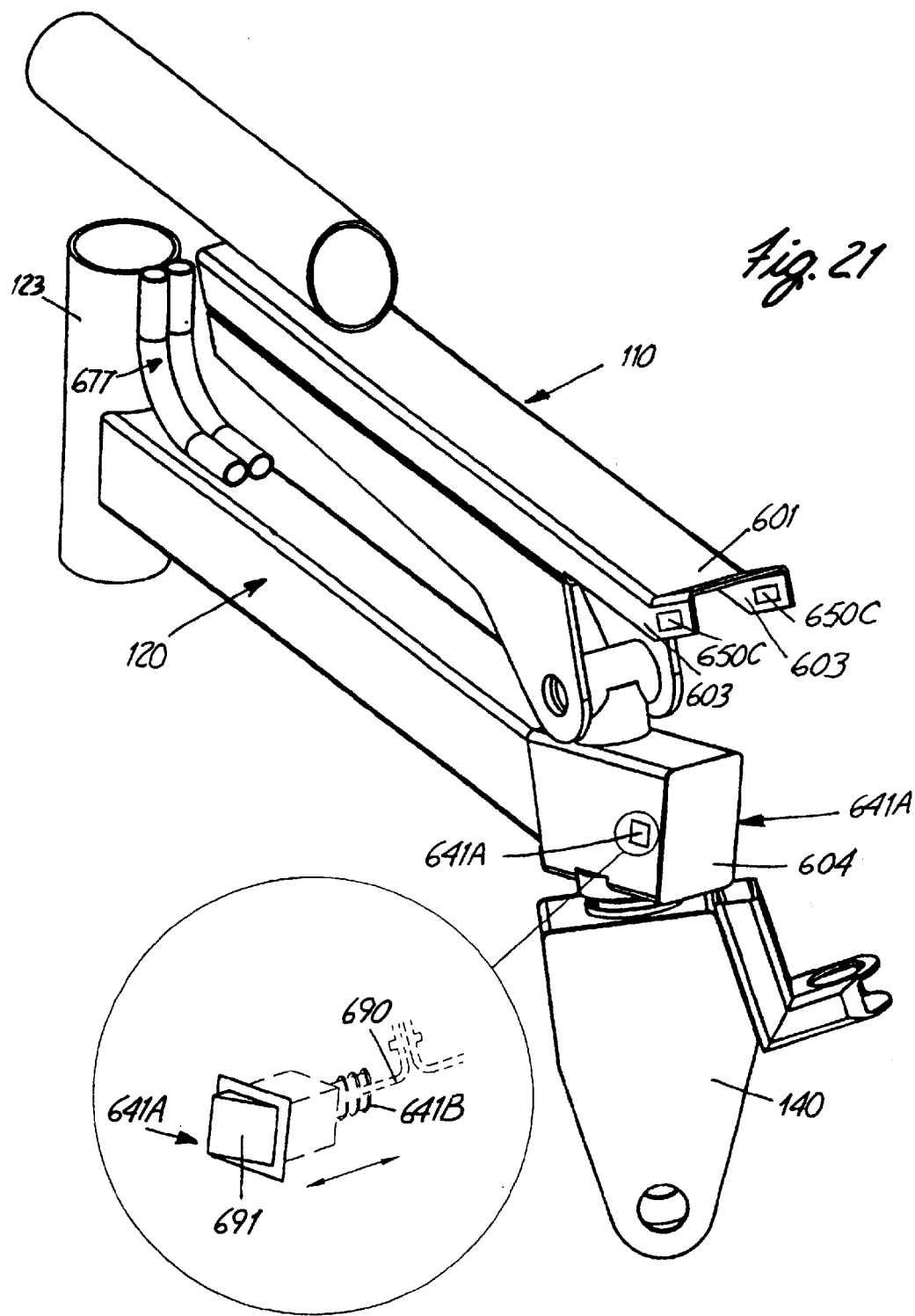

FOLDABLE BICYCLE

The present invention relates to a foldable bicycle according to the preamble of claim 1.

Such a bicycle is known from DE-A-196 36 900.

Foldable bicycles are known in practice. Compared with "ordinary" bicycles, i.e. non-foldable bicycles, foldable bicycles offer the advantage that the bicycle in folded condition occupies relatively little space and can readily be transported, while the bicycle in unfolded condition can be ridden as an "ordinary" bicycle.

Known foldable bicycles generally have a construction comparable with the construction of an ordinary, i.e. non-foldable bicycle, with pivotal connections and/or sliding connections provided in different places in the frame, which connections in a normal operating condition of the bicycle, i.e. the unfolded condition, are secured by securing means. If the bicycle is to be folded up, those securing means are undone and the frame is hinged at those pivotal connections, respectively pushed in at the sliding connections.

In a foldable bicycle known in practice, the frame has a pivotal connection which in the operating condition is locked by a quick-acting closure, usually a closing clamp based on the eccentric principle. The saddle pin is slidable in the saddle tube and is clamped therein by a clamping connection which is likewise operated by a quick-acting closure. The steering stem is slidable and rotatable in the steering head, and is clamped therein by a clamping connection likewise operated by a quick-acting closure. A major drawback of a sliding connection, as is for instance used for the saddle pin in the saddle tube, is that it is inconvenient for the user to precisely adjust the saddle pin at its proper length again when the bicycle is being unfolded. Similarly, it is inconvenient for the user to precisely reset the height and orientation of the handlebar in the proper position. Further, known foldable bicycles have the drawback that the undoing and securing of the pivotal connections is relatively complicated, requires relatively much force and usually results in dirty hands. More in particular, the number of operations to be performed is rather high: retracting the saddle pin into the saddle tube requires three operations, viz. undoing the saddle clamp, pushing in the saddle pin, and securing the saddle pin in the pushed-in condition. Retracting the steering stem into the steering head requires three operations as well. Finally, folding up the frame also requires three operations: undoing the frame pivot, pivoting the two frame halves, and securing the frame pivot again in the folded condition.

The above in any case results in that folding and, to a worse extent, unfolding a known bicycle require relatively much time and dexterity.

In everyday life, there is an ever-increasing demand for mobility. For instance in the field of commuter traffic, there is a tendency from a situation where the commuting distance is relatively small to a situation where that distance is fairly great. This can particularly be observed in urban environments, where offices and the like are located in town but where employees prefer living in a quiet, out-of-town environment, for instance in a village. On the other hand, the possibility of every employee travelling between home and work with his own car becomes smaller and smaller, and from an environmental viewpoint, this is less and less desirable, too. Further, the possibility of travelling by car within the center of a town becomes smaller and smaller.

Hence, in this context, there is a growing need for a foldable bicycle that can readily be taken along in one's own car or public transport. However, presently available foldable bicycles prove to be insufficiently capable of meeting that need. The reason for this resides in the drawbacks associated with those bicycles.

It is an object cache present invention to provide a foldable bicycle which meets that need in a better manner.

It is a particular object of the present invention to provide a foldable bicycle which in folded condition occupies as little space as possible. It is a further object of the present invention to provide a foldable bicycle which can be folded relatively simply and quickly while requiring little force. Further, it is an object of the present invention co provide a foldable bicycle wherein the unfolding can be effected relatively simply and quickly while requiring relatively little force and relatively few operations, and wherein the bicycle reliably returns from the folded condition into the desired unfolded condition.

These and other aspects, features and advantages of the present invention will be clarified by the following description of a preferred embodiment of a foldable bicycle according to the invention, with reference to the accompanying drawings, in which:

FIG. 3 is a schematic front view of the bicycle shown in FIGS. 1 and 2;

FIGS. 4A and 4B are front views comparable with FIG. 3, to illustrate the folding of the handlebar;

Figure 16A:
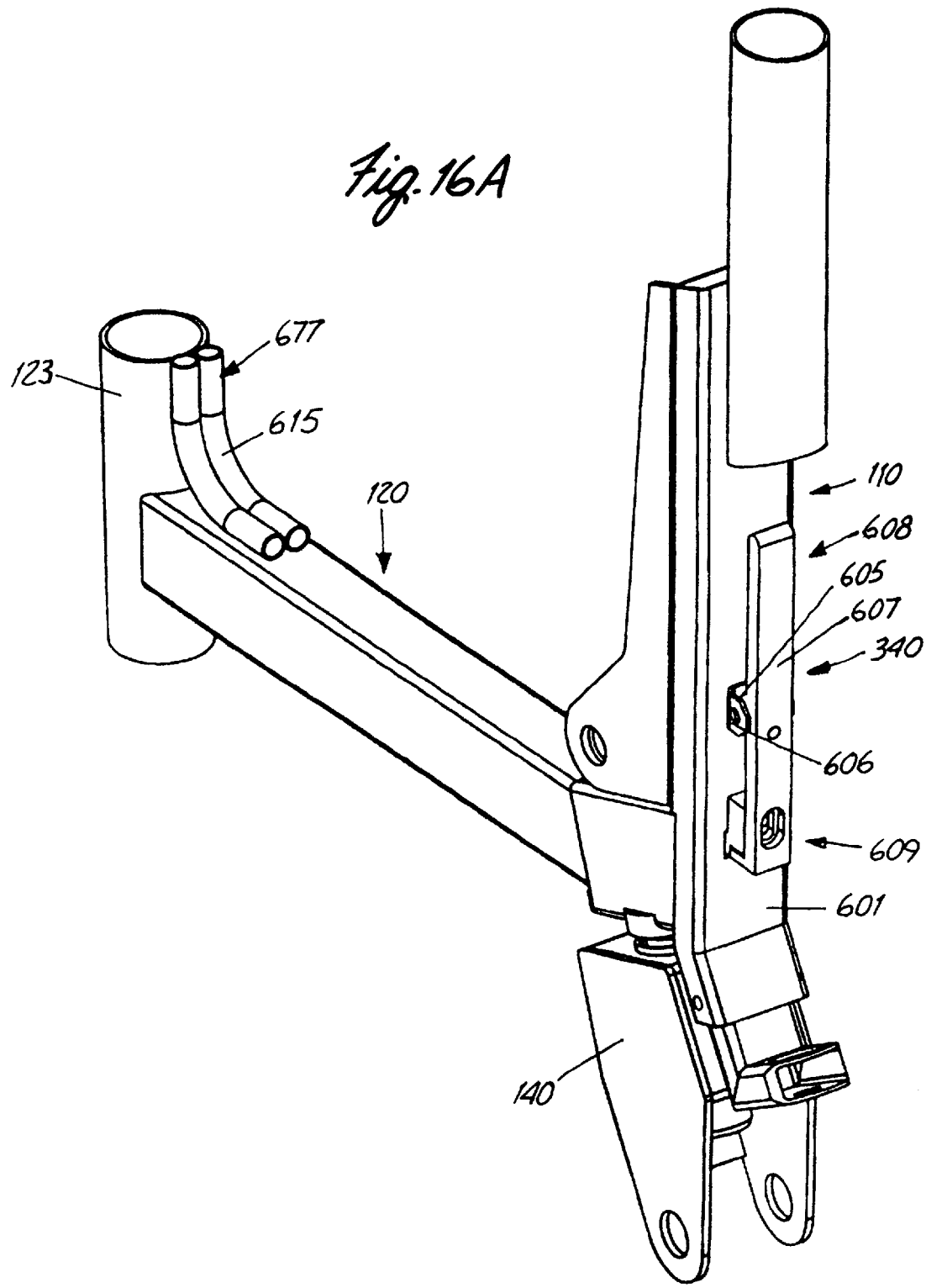
Figure 16B:
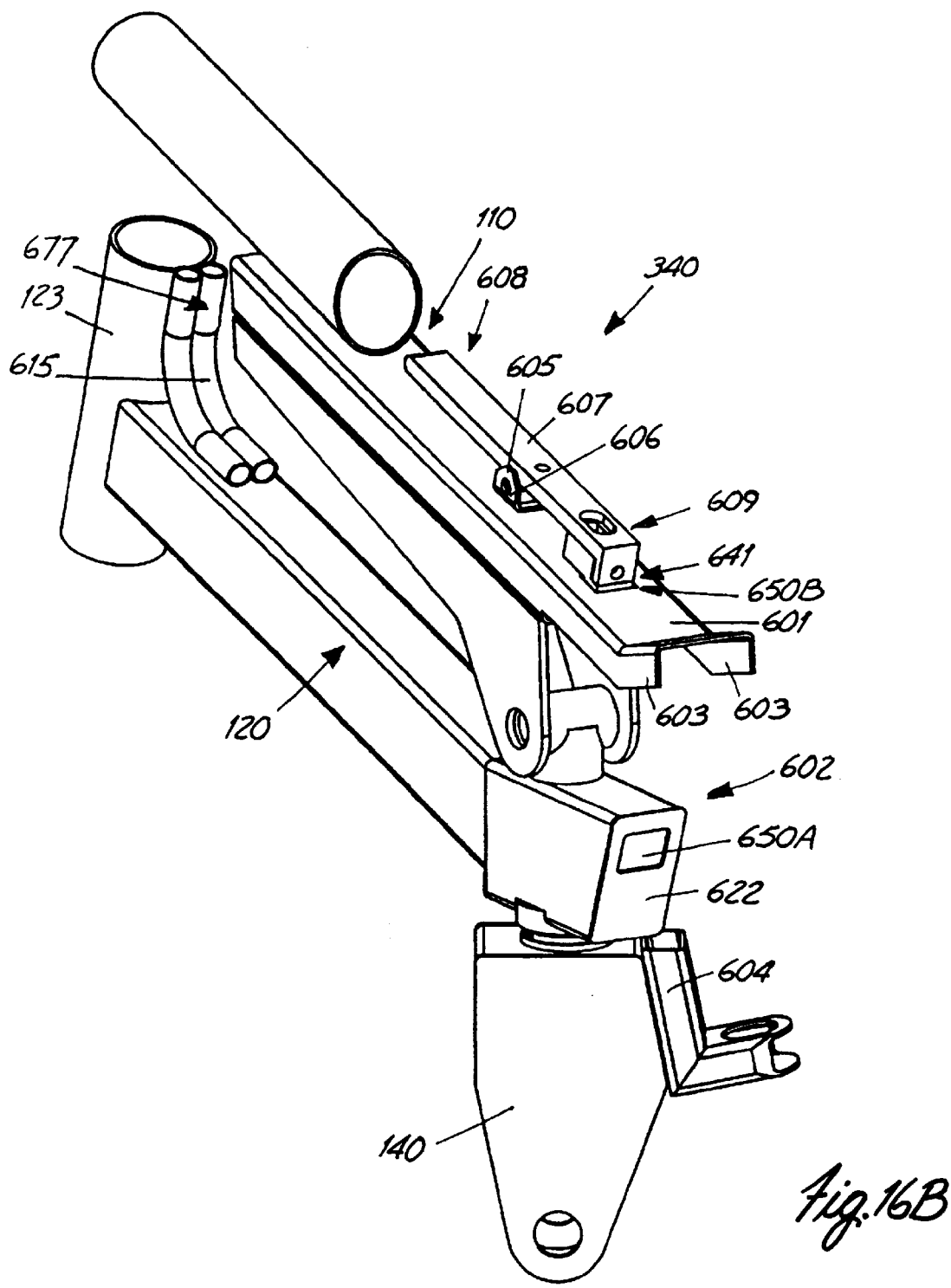
Figure 18:
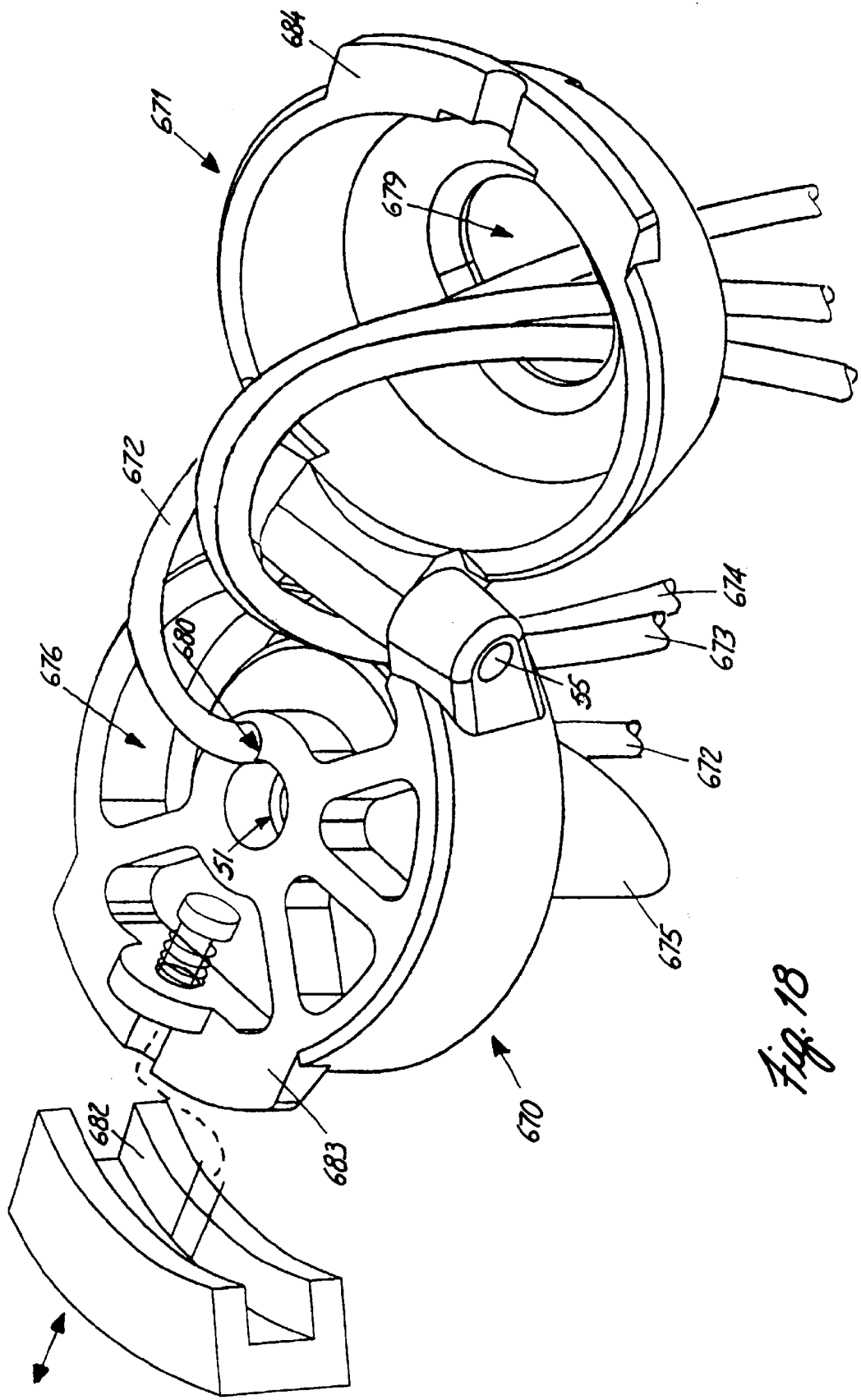
Figure 19:
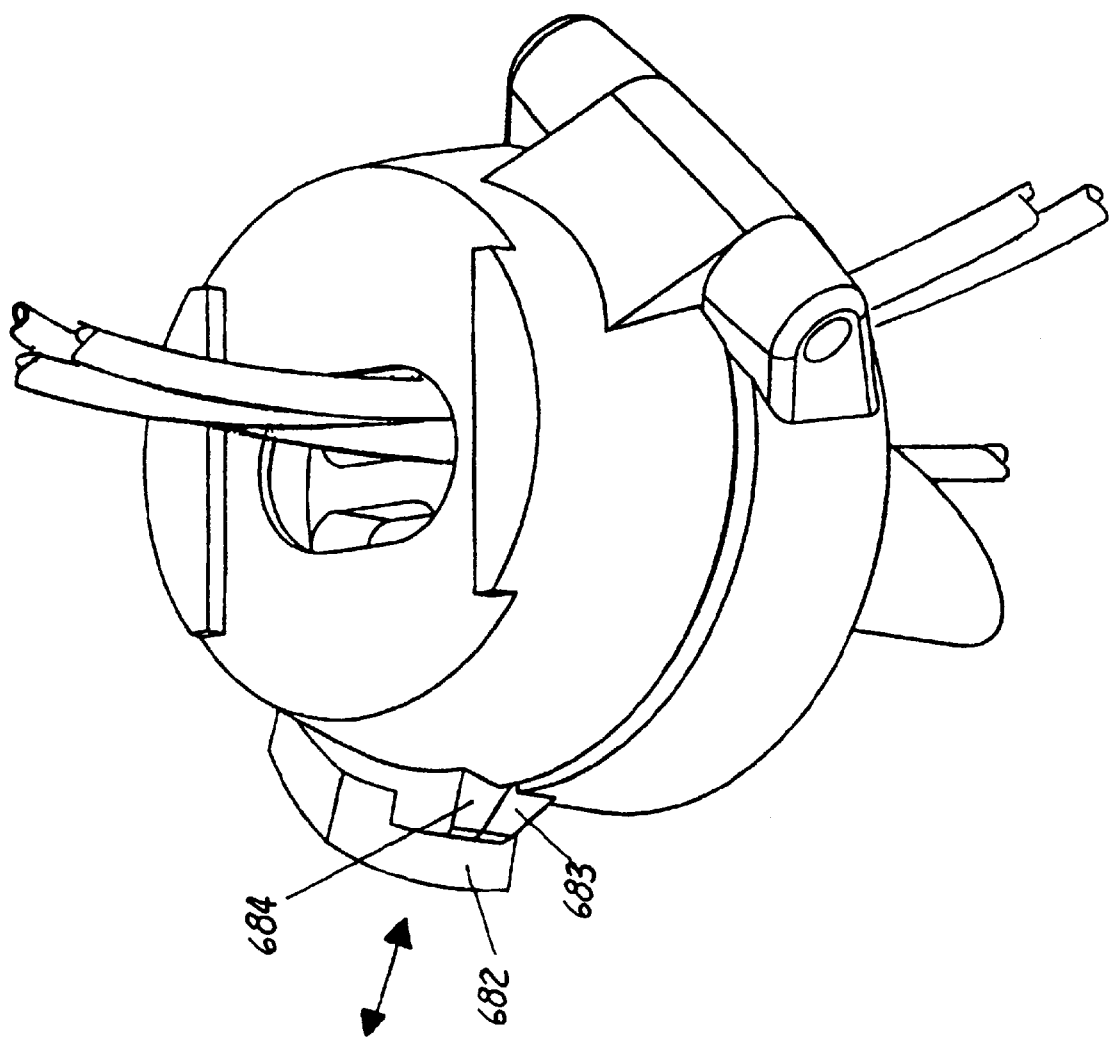
Figure 20:
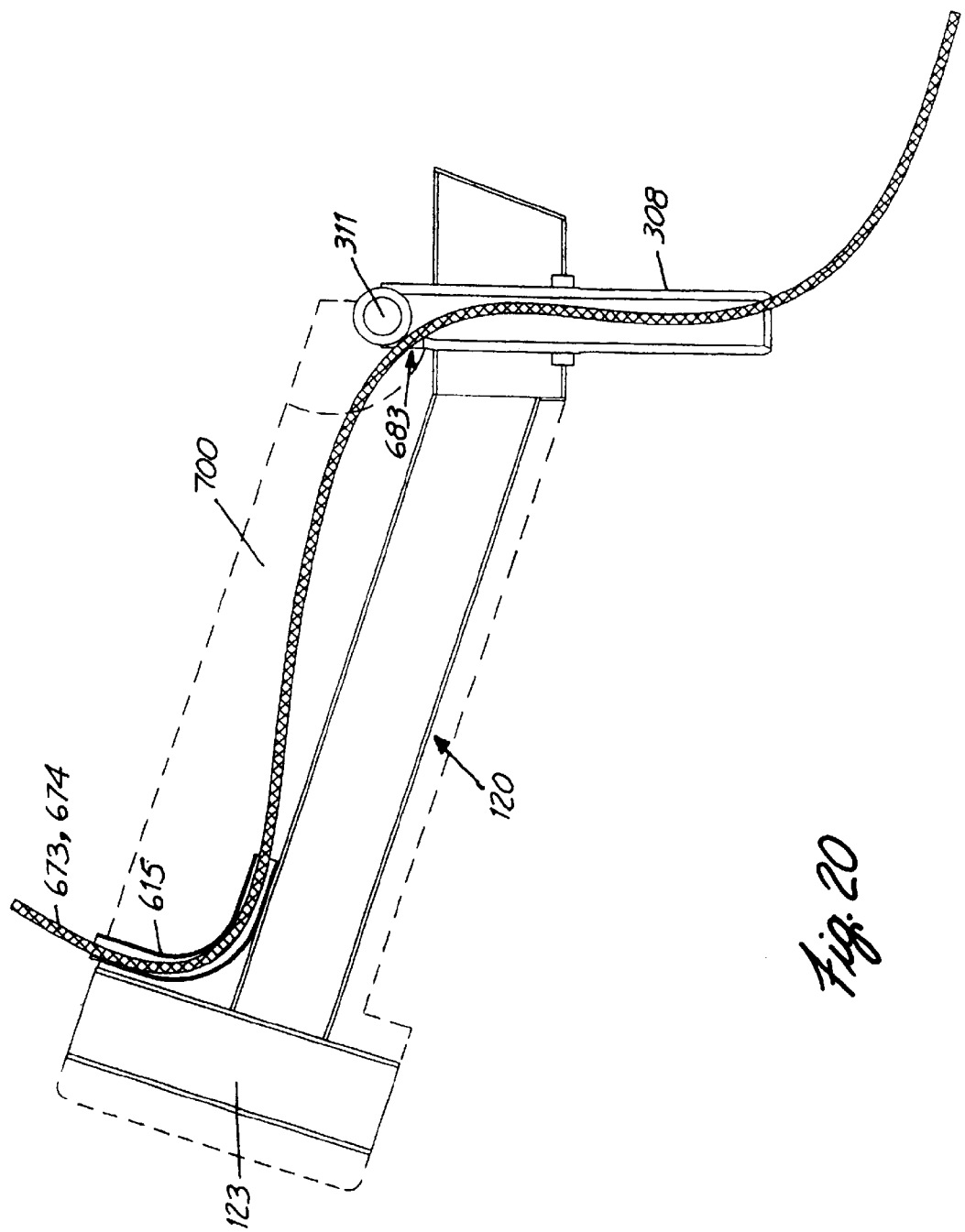

FIGS. 14A–D show a second embodiment of a bicycle according to the invention in four positions;

FIG. 15 is a side elevation of a portion of a frame for the bicycle of FIG. 14, the frame covering being left out;

FIGS. 16A and 16B are perspective views of the frame shown in FIG. 15, respectively in completely unfolded and locked condition and in partially folded condition;

FIGS. 17A–C are three comparable sectional views of the locking means and the parts cooperating therewith of the frame of the bicycle of FIG. 14;

FIGS. 18 and 19 show a coupling for the steering system of the bicycle of FIG. 14;

FIG. 20 schematically shows, in a sectional side elevation, how the cables are led through in the bicycle according to FIG. 14; and FIG. 21 shows alternative embodiment of a locking of the saddle arm in the bicycle according to FIG. 14.

Figure 1:
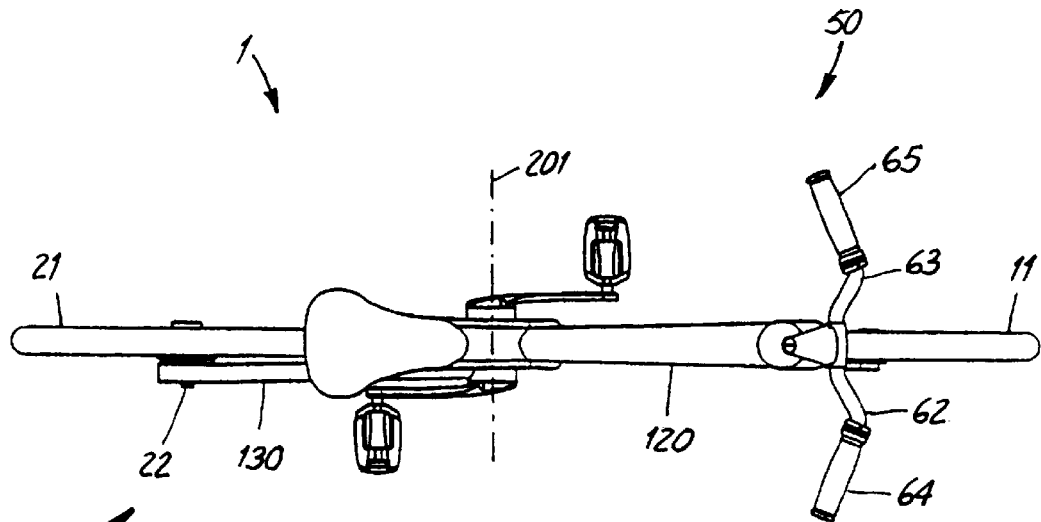
FIG. 1 is a top plan view of a foldable bicycle according to the present invention in unfolded condition.
Figure 2:
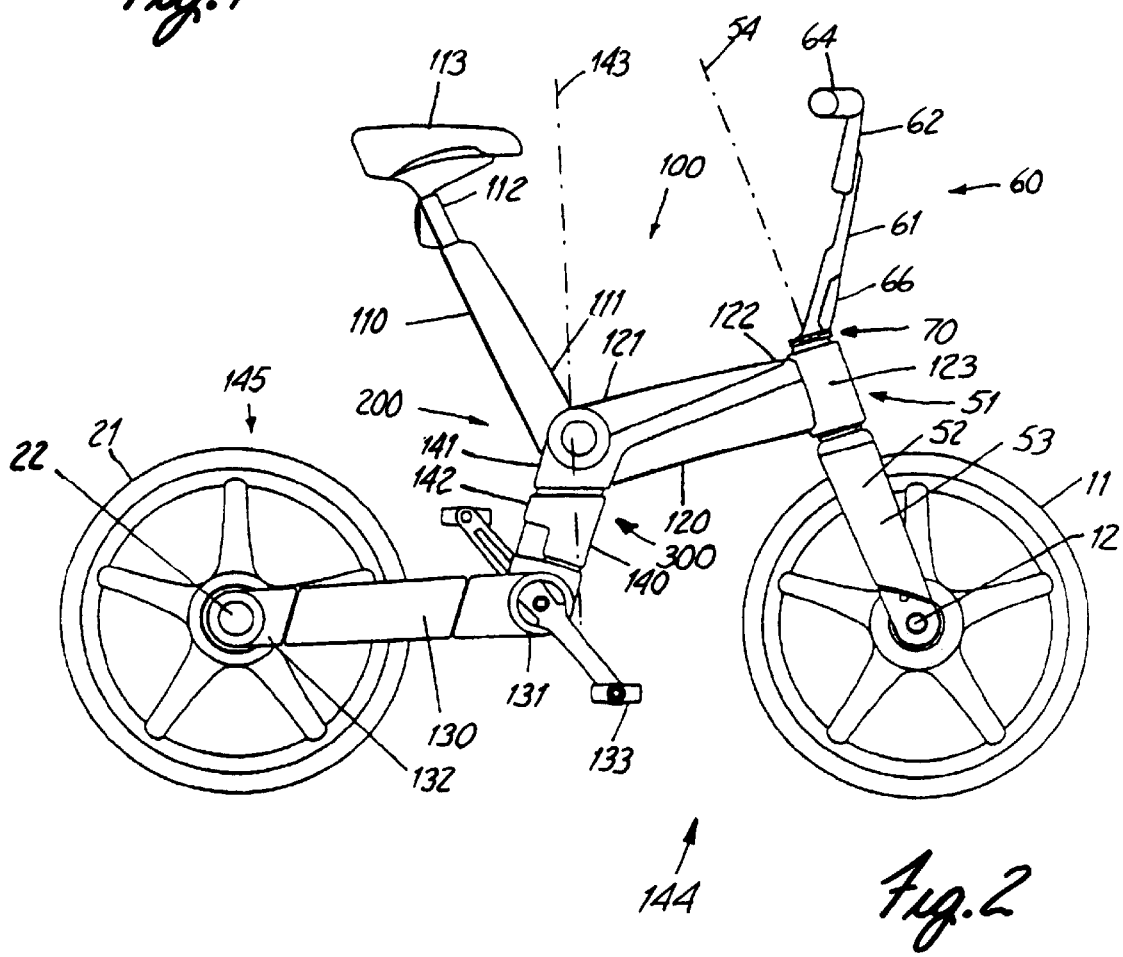
FIG. 2 is a side elevation of a foldable bicycle according to the present invention in unfolded condition.

Reference is now made to FIGS. 1 and 2 to explain the construction of a foldable bicycle according to the present invention, generally designated by reference numeral 1. The bicycle 1 has a frame 100 comprising three arms 110, 120, 130 and a central leg 140. The central leg 140 comprises an upper leg portion 141 which is rigidly connected to the second arm 120 and preferably forms an integral whole with the second arm 120. The central leg 140 further comprises a lower leg portion 142 which is rigidly connected to the third arm 130 and preferably forms an integral whole with the third arm 130.

The first arm 110 has a first end 111 coupled to a first end 121 of the second arm 120. At a second end 112 located opposite the first end 111, a saddle 113 is mounted on the first arm 110. Thus, the first arm 110 is comparable with the saddle tube of conventional bicycles. Hereinafter, the first arm 110 will also be designated by the term "saddle arm" and the second end 112 of the saddle arm 110 will also be designated by the term "saddle end".

At a second end 122 located opposite the first end 121, a steering head 123 is mounted on the second arm 120, which steering head 123 mounts a steering system 50. The steering head 123 may, have a construction known per se, and will therefore not be further explained. It suffices to observe that the steering head 123 generally has the form of a cylinder, the axis 54 of that cylinder being slightly inclined relatively the vertical, with a steering stem 51 of the steering system 50 extending through that cylinder, which stem is not drawn for the sake of simplicity. Mounted on a lower end of the stem 51 is a front fork 52. On a lower end of the front fork 52, a front wheel 11 is bearing-mounted for rotation.

As is known, the front fork normally has two legs, and the axle of the front wheel is attached at the respective ends of those two legs of the front fork. According to an important aspect of the present invention the front fork 52 has only one single leg 53, and the axle 12 of the front wheel 11 is bearing-mounted at only one end thereof in the single leg 53 of the front fork 52, as is clearly illustrated in the schematic front view of FIG. 3. Such single-sided bearing offers advantages during the folding of the bicycle, because the total thickness of the package formed by the folded bicycle may then be particularly small, as will be explained in more detailed hereinbelow.

As the nature and construction of the single-sided bearing of the front axle 12 in the front fork 52 do not constitute a subject of the present invention, and a skilled person need not have any knowledge thereof for a proper understanding of the present invention, while use can moreover be made of constructions that are known per se for such single-sided bearing, it will not be further described.

The steering system 50 further comprises a substantially Y-shaped handlebar 60 having a central steering leg 61 and two steering arms 62, 63, provided with handgrips 64, 65 at their respective ends. In the normal operating condition, viewed from aside (see FIG. 2), the steering leg 61 makes an angle with the vertical, opposite to the angle made by the steering head 123 with the vertical. That is to say, starting form the steering head 123, the steering leg 61 is directed forwards.

By means of a handlebar coupling member 70, the lower end 66 of the steering leg 61 is connected to the upper end of the stem 51 extending through the steering head 123.

Under normal operating conditions, the handlebar coupling member 70 is in a locking condition, in which a rigid connection is established between the steering leg 61 and the stem 51. In that case, the steering arms 62, 63 project symmetrically relative to a plane of symmetry defined by the front wheel 11. For the purpose of folding the bicycle 1, the handlebar coupling member 70 can readily be brought into a release condition, in which the handlebar coupling member 70 permits a rotational movement and a pivotal movement of the handlebar 60 relative to the stem 51.

FIGS. 4A and 4B are front views comparable with FIG. 3 which illustrate said rotational and pivotal movements. In the release condition of the handlebar coupling member 70, the handlebar 60 can rotate about the axis of rotation 54 defined by the longitudinal direction of the stem 51. Upon rotation through an angle of about 90°, the intermediate position illustrated in FIG. 4A is reached, in which the steering arms 62, 63 are directed substantially parallel to the plane of symmetry defined by the front wheel 11. From this intermediate position, the handlebar 60 can pivot about a pivotal axis 55 which is substantially perpendicular to said axis of rotation 54 and which is directed substantially parallel to said plane of symmetry. After pivoting through an angle of more than 180°, the folding position illustrated in FIG. 4B is reached, in which the steering leg 61 abuts tightly against the steering head 123 and the single leg 53 of the front fork 52. FIG. 4B clearly demonstrates that the steering leg 61 has a contour which enables such tight abutment.

Figure 5:
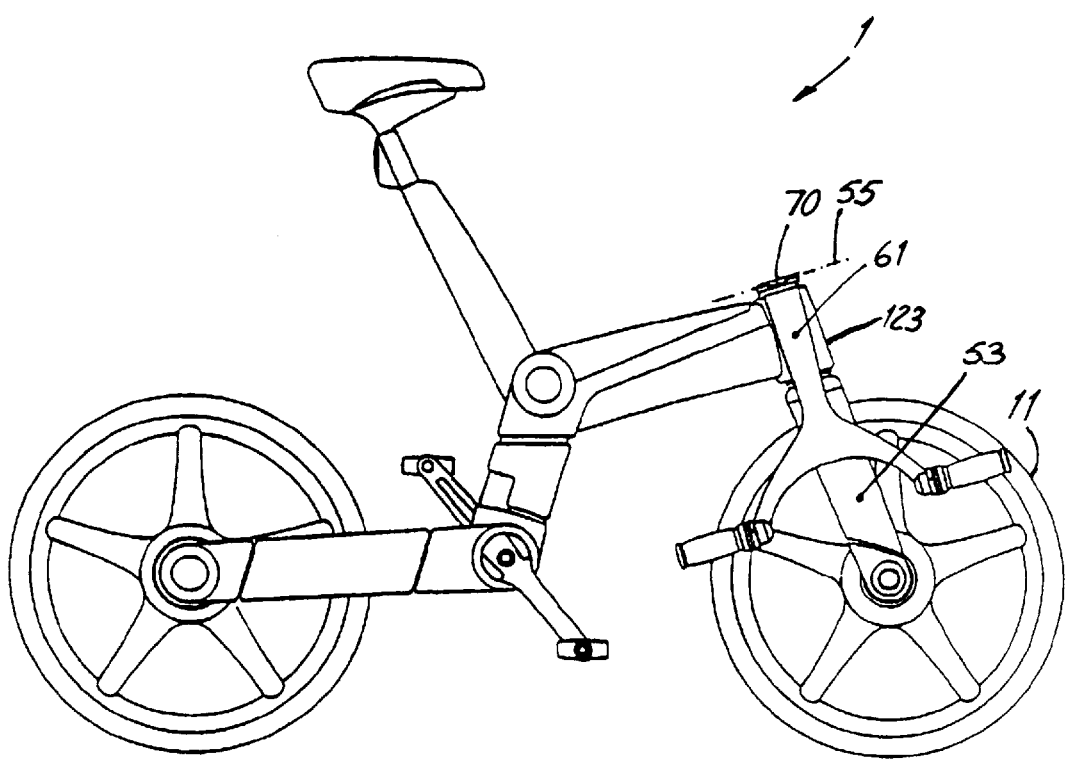
FIG. 5 is a side elevation comparable with FIG. 2, illustrating the folded condition of the handlebar.

FIGS. 5 and 14B are side elevations or the bicycle 1 comparable with FIG. 2, in which the handlebar 60 is folded in.

In a preferred embodiment, the bicycle 1 comprises means for retaining the handlebar 60 in the folded condition illustrated in FIGS. 4B, 5 and 14B–D, relative to the front fork 52. To this end, the bicycle 1 may comprises for instance clamping means or the like. Preferably, the handlebar 60 is retained by magnetic force. This inter alia offers the advantage that the retaining force comes automatically into action and helps to pull the handlebar 60 into the folded condition, that the risk of damage as may be present when clamping means are used, is minimal, and that no additional operations are required for removing the retaining force. Another important advantage of the use of magnetic force is that it is possible a simple and inexpensive manner to incorporate a permanent magnet (shown in dotted lines at 56 in FIG. 4A) into the front fork 52. Like at least the second and third arms 120, 130 of the frame 100, the front fork 52 is preferably constructed in the form of a steel core which, for defining the outward form, has a synthetic material such as for instance PUR, or another suitable substance such as for instance rubber, sprayed around it. This for instance enables electric wires and/or brake cables to be invisibly integrated into respectively the front fork and the frame. In this manner, the magnet 56 mentioned may also be readily integrated into the font fork 52 so as to be invisible. This point will be further addressed with reference to FIGS. 14 ff.

If so desired, it is possible to integrate a permanent magnet both into the front fork 52 and into the handlebar 60, which permanent magnets cooperate in the folded condition illustrated in FIGS. 4B and 5, for instance if the front fork 52 and the handlebar 60 do not contain magnetizable material, for instance because their cores are manufactured from aluminum.

Alternatively, the clamping means can be defined by mating profiles of the handlebar 60 and the front fork 52.

As will be described in more detail hereinbelow, the first end 111 of the saddle arm 110 and the first end 121 of the second arm 120 of the frame 100 are pivotally intercoupled by pivot means 200 whose pivotal axis 201 is directed substantially horizontally, perpendicularly to the longitudinal direction of the bicycle 1. In the normal operating condition as illustrated in FIG. 2, .those pivot means 200 are locked to disable the pivotal movement, and the saddle arm 110 is directed upwards, directed slightly rearwards relative to the vertical. For the purpose of folding the bicycle 1, that locking can be removed. The saddle arm 110 can then pivot forwards about said pivotal axis 201 to reach a folding position in which the saddle arm 110 is directed substantially parallel to the second arm 120 of the frame 100. This folding position is illustrated in FIGS. 6A and 14C.

In the cross section of FIG. 63, it is shown that the saddle arm 110 can have a substantially U-shaped cross section, the concave side of that U-shape facing the second arm 120 of the frame 100, That U-shape on the one hand offers the advantage that the saddle arm 110 has a proper flexural rigidity. On the other hand, it offers the advantage that the saddle arm 110, in the folded condition thereof, can at least partially embrace the upper side of the second arm 120. To that end, the upper side of the second arm 120 has a contour fitting in the internal contour of said U-shape.

Figure 6A:
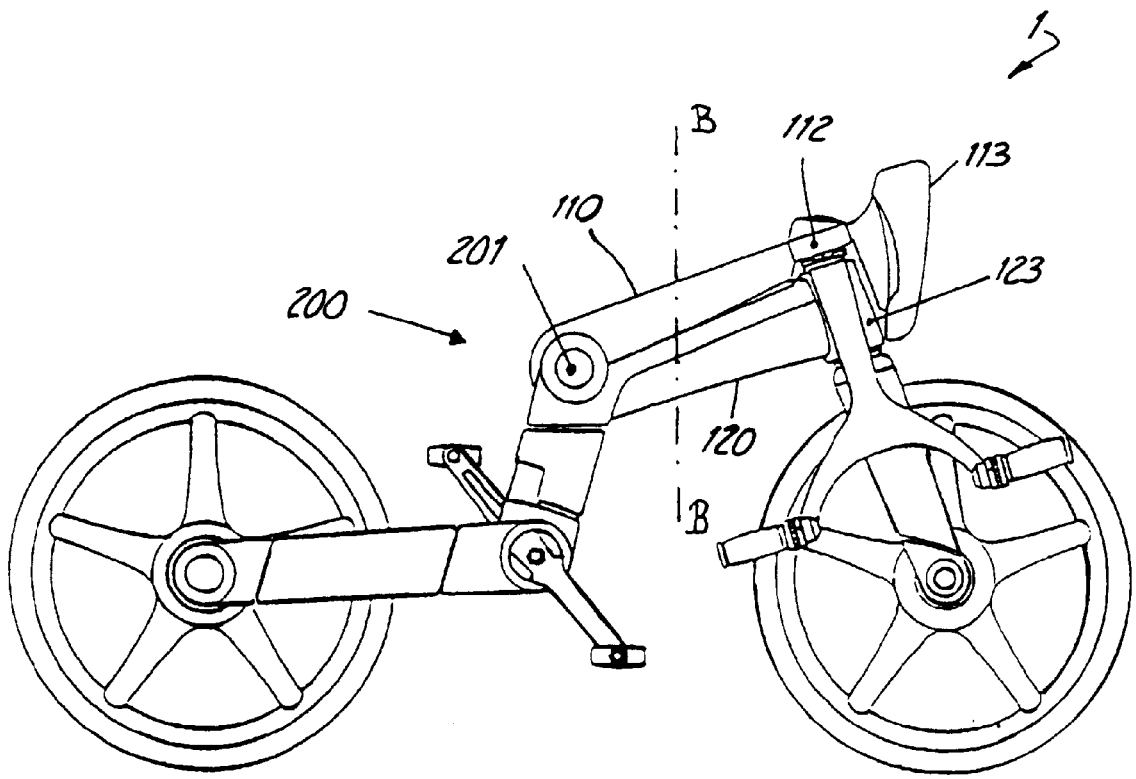
FIG. 6A is a side elevation comparable with FIG. 2, illustrating the folded condition of the saddle arm.
Figure 6B:
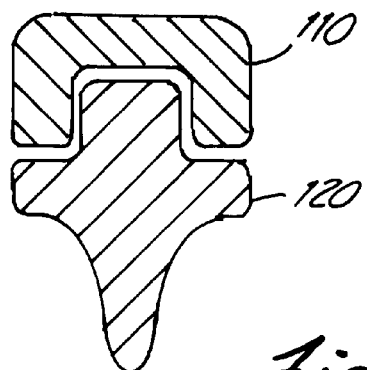
FIG. 6B is a cross section taken on the line B#B in FIG. 6A.
Figure 14A:
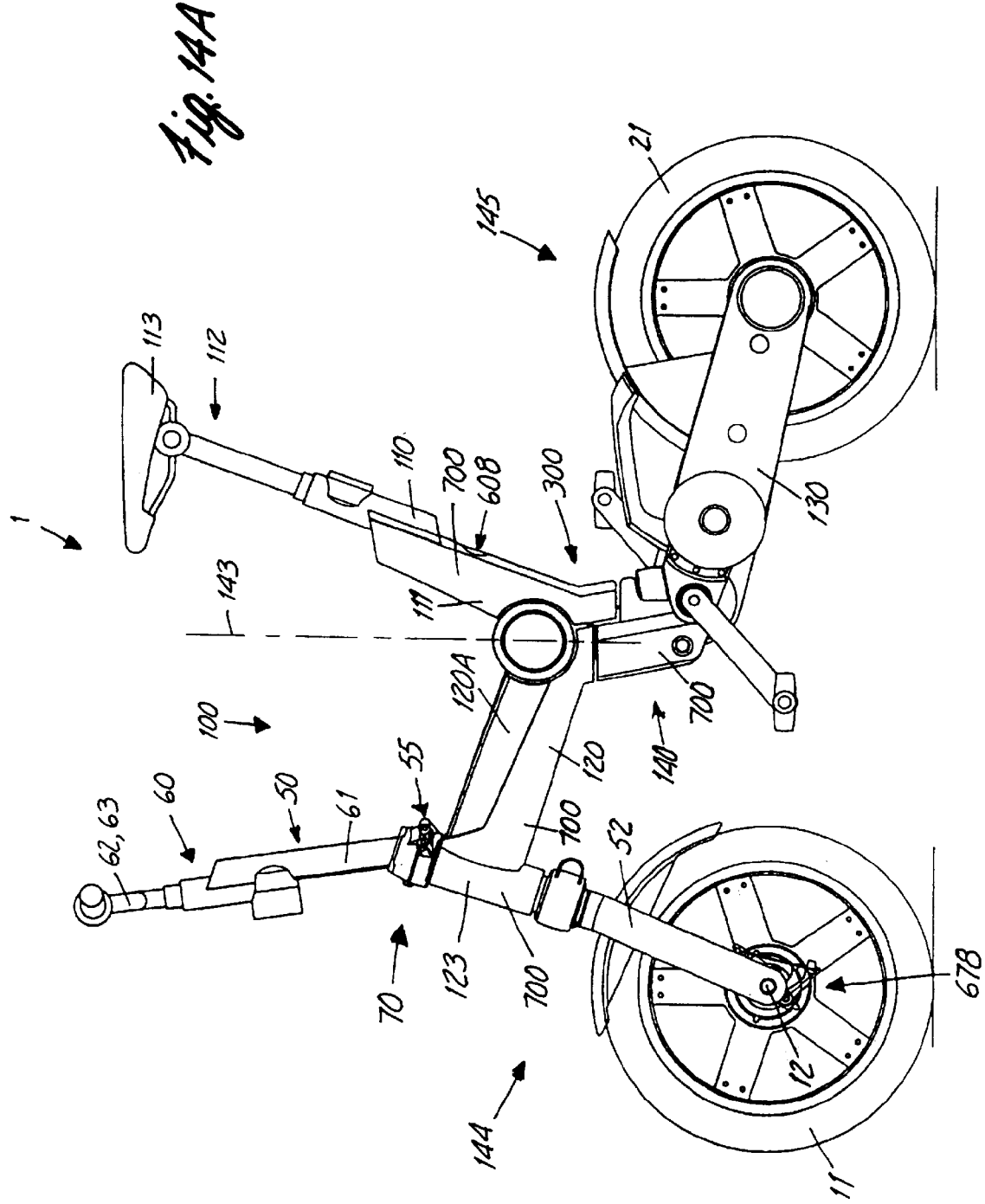
Figure 14C:
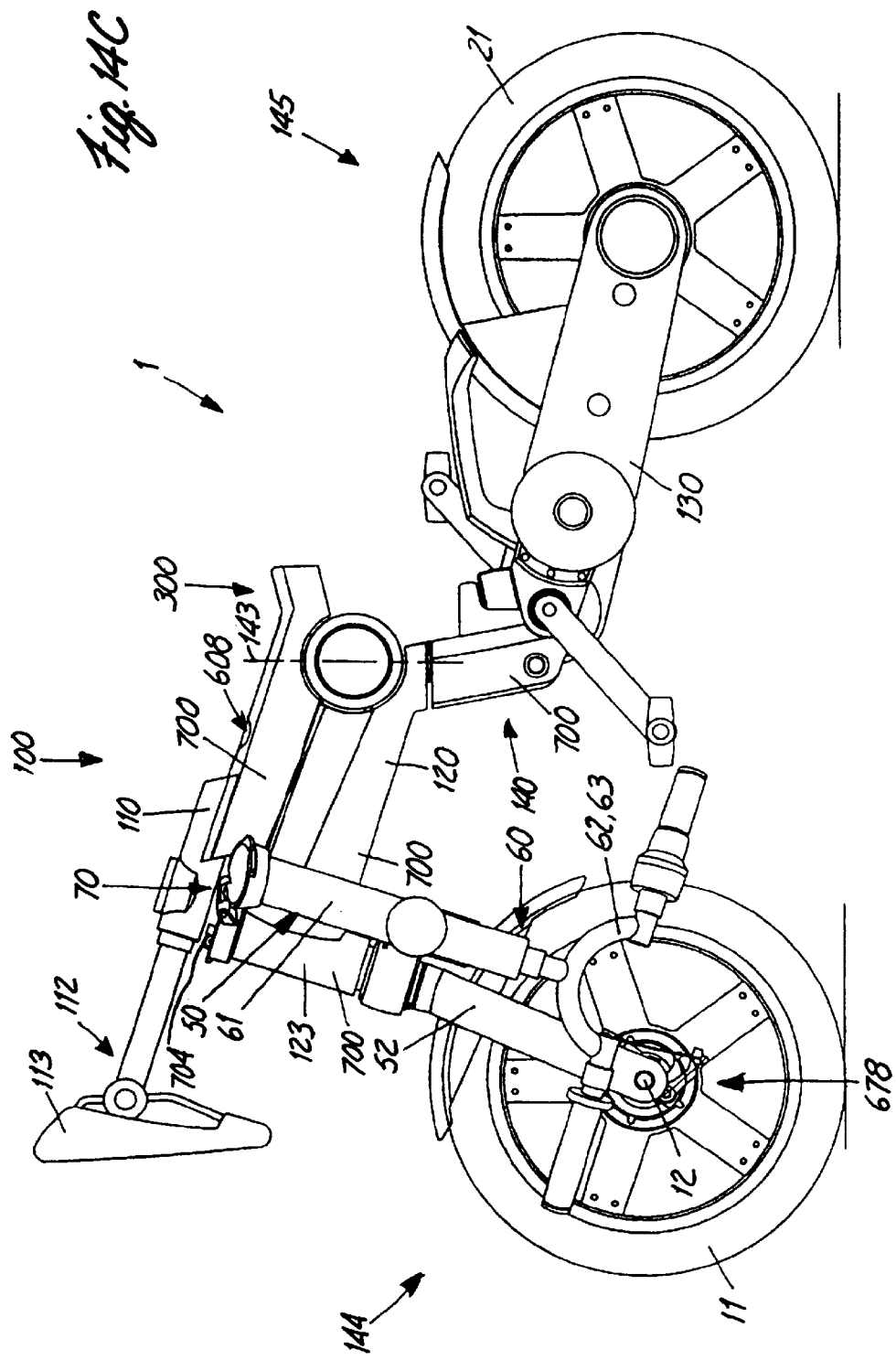

As is clearly demonstrated in FIGS. 6A and 14C, the length of the saddle arm 110, measured from the pivotal axis 201 to the saddle 113, is slightly greater than the corresponding length of the second frame arm 120, measured from the pivotal axis 201 up to and including the steering head 123. The U-shaped portion, of the saddle arm 110 is not longer than the second frame arm 120, measured up to the steering head 123, and at the level of the steering head 123, the saddle end 112 of the saddle arm 110 has a substantially rectangular cross section, at least a relatively slight vertical dimension of, for instance, about 3 cm. In the folded condition, that saddle end 112 of the saddle arm 110 substantially abuts against the upper side of the steering head 123, and the front tip of the saddle 113 extends downwards at the front side of the steering head 123. The effect of all this is that in the folded condition the combination of the saddle arm 110 and the second arm 120 is as compact as possible.

In a preferred embodiment, the saddle arm 110 comprises coupling means 70A capable of cooperating with the coupling means 70 of the steering head when the saddle arm 110 and steering device 50 are folded in, enabling the saddle arm 110 in folded condition to be secured with the coupling means 70, 70A.

A further important advantage of the construction discussed is that when the bicycle 1 is made operational again, the saddle 113 and the handlebar 60 automatically end up in the proper positions again, without the user having to reset the height of the saddle 113 and the handlebar 60.

The third frame arm 130 is directed substantially horizontally and has a front end 131 and a rear end 132. At the rear end 132 of the third frame arm 130, a rear wheel 21 is bearing-mounted for rotation. In a similar manner as described hereinabove in respect of the front wheel 11, the rear axle 22 of the rear wheel 21 is bearing-mounted in the third frame arm 130 at only one end thereof, as is clearly shown in FIG. 1.

Accommodated in the third frame arm 130 are drive means for the bicycle 1. Those drive means comprise a set of pedals 133 rotatably provided at the front end 131 of the third frame arm 130, and means for transmitting a rotational movement of the pedals 133 to the rear wheel 21. As the nature and constructed of such transmission means do not constitute a subject of the present invention, and a skilled person need not have any knowledge thereof for a proper understanding of the present invention, while use can moreover be made of transmission means known per se, such as a chain, these means will not be further described. It suffices to observe that those transmission means are accommodated in a cavity in the third frame arm 120, so that those transmission means are entirely enclosed by the third frame arm 130, which for instance prevents a user's coat from being fouled by contracting those transmission means. Conversely, no dirt can penetrate into the third frame arm. 130, as a result of which the transmission means in the third frame arm 130 require little maintenance.

As mentioned, the frame leg 140 comprises an upper leg portion 141 and a lower leg portion 142. The relative lengths of those leg portions 141, 142 are not relevant to the present invention; in the example shown, the upper leg portion 141 is fairly short, and almost the entire length of the frame leg 140 is determined by the length of the lower leg portion 142. In the example shown, the longitudinal direction of the frame leg 140 makes an angle with the vertical, but this, too, is not essential for the present invention.

Figure 7:
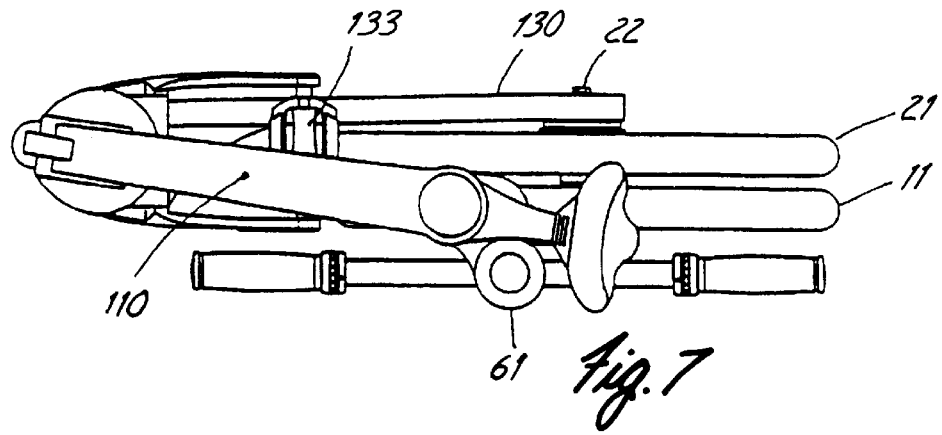
FIG. 7 is a top plan view comparable with FIG. 1, illustrating the folded condition of the frame.
Figure 8:
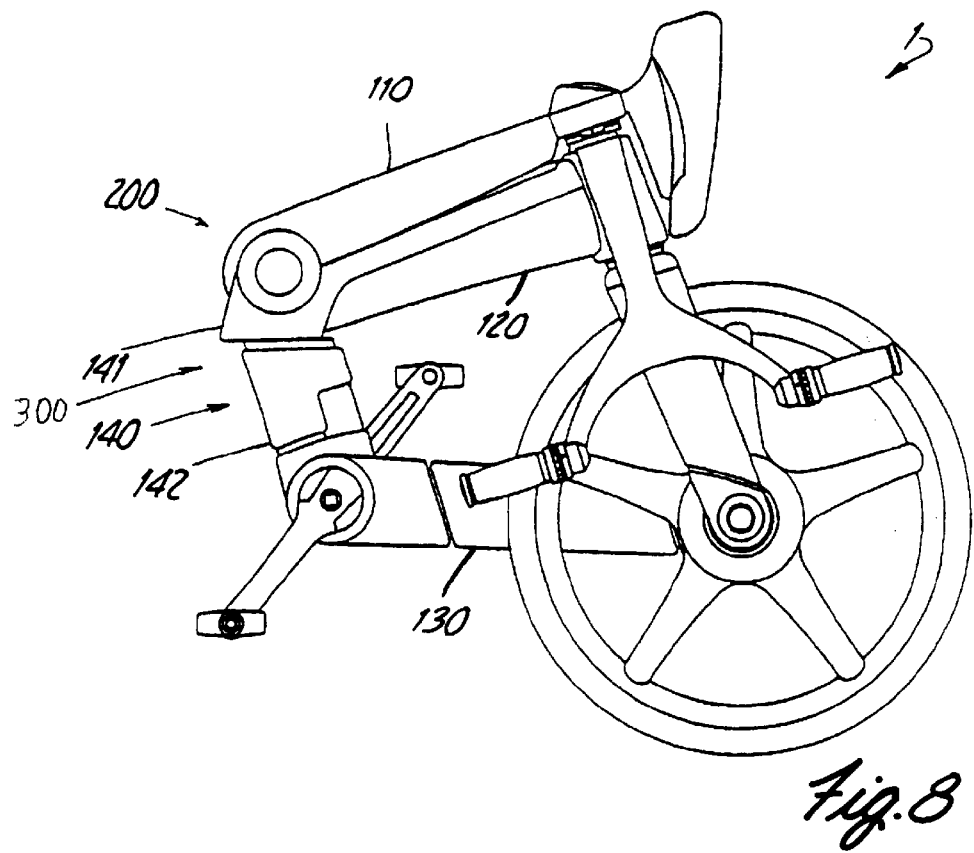
FIG. 8 is a side elevation comparable with FIG. 2, illustrating the folded condition of the frame.

According to an important feature of the present invention, the bicycle 1 comprises rotational coupling means 300 which couple the upper leg portion 141 and the lower leg portion 142 relative to each other. Under normal operating conditions, those rotational coupling means 300 are locked, causing the upper leg portion 141 and the lower leg portion 142 to be rigidly interconnected, in the orientation shown in FIG. 2. When that locking is removed, the upper leg portion 141 and the lower leg portion 142 are rotatable relative to each other about a substantially vertically directed axis so rotation 143. The frame 100 of the bicycle 1 can now be considered to be divided into two halves 144 and 145. A first half 144 concerns the combination of the upper leg portion 141, the saddle arm 110, the second frame arm 120, which half hence carries the saddle 113, the front wheel 11 and the steering system 50. A second half 145 concerns the lower leg portion 142 and the third frame arm 130, which second half hence carries the pedals 133 and the rear wheel 21. Hence, this freedom of rotation implies that the two frame halves 144 and 145 can pivot relative to each other about that vertical axis of rotation 143. Because the distance from the front axle 12 to the axis of rotation 143 is substantially equally large as the distance from the rear axle 22 to the axis of rotation 143 the result of said pivotal movement is that the front wheel 1 and the rear wheel 21 abut against each other, with the front axle 12 and the rear axle 22 being substantially in line. Now, the fully folded operating condition has been reached. FIG. 7 is a top plan view comparable with FIG. 1 of this fully folded operating condition, and FIGS. 8 and 14D are side elevations comparable with FIGS. 2 and 14A respectively of this fully folded operating condition.

The top plan view of FIG. 7 clearly reveals an advantage of the one-sided wheel suspension: in the fully folded condition, the front wheel 11 and the rear wheel 21 are in very close abutment. Since the folded handlebar 60 moreover abuts very closely against one arm 53 of the front fork 52, the total thickness of the folded bicycle 1 is particularly small. Moreover, also in folded condition, the bicycle can be moved on its own wheels, as the wheels lie substantially in parallel planes.

In a preferred embodiment, the bicycle 1 comprises clamping means for retaining the two frame halves 144 and 145 in the folded condition relative to each other. Such clamping means are preferably snap members which, on the basis of their shape, automatically cooperate when the two frame halves 144 and 145 are brought into the folded condition, so that this requires no separate operation. Examples of such clamping means are known to skilled persons. In a particularly useful embodiment, such clamping means are arranged at the axles 12 and 22 of the wheels 11 and 21 respectively, at the free ends of those axles, i.e. opposite the ends whereby the axles 12 and 22 are bearing-mounted in the one-armed front fork 52 and the third frame arm, 130 respectively. For simplicity's sake, these clamping means are not illustrated in the Figures.

In the preferred embodiment as illustrated in FIG. 7, the pedals 133 are foldable as well. Since such foldable pedals 133 are known per se, and since such foldable pedals, known per se, can be used with the foldable bicycle 1, this aspect will not be further explained.

In principle, any suitable means can be used for configuring the freedom of rotation of the upper leg portion 141 and the lower leg portion 142, and any suitable locking means can be used for blocking those rotational means in the normal operating condition. Similarly, the pivot means and the locking means for the saddle arm 110 may be any suitable means. However, in the first and second preferred embodiments of bicycles according to the present invention to be discussed hereinbelow, the blocking of the rotational coupling means 300 for the frame halves 144 and 145 is removed by pivoting the saddle arm 110 forwards, or at least during said pivoting. This may involve a handgrip for unlocking the pivot means of the saddle arm 110 being situated under the saddle 113. The effect thus achieved is that unlocking the saddle arm 10, pivoting the saddle arm 110 forwards and unlocking the frame leg 140 is in fact one single operation.

Figure 9:
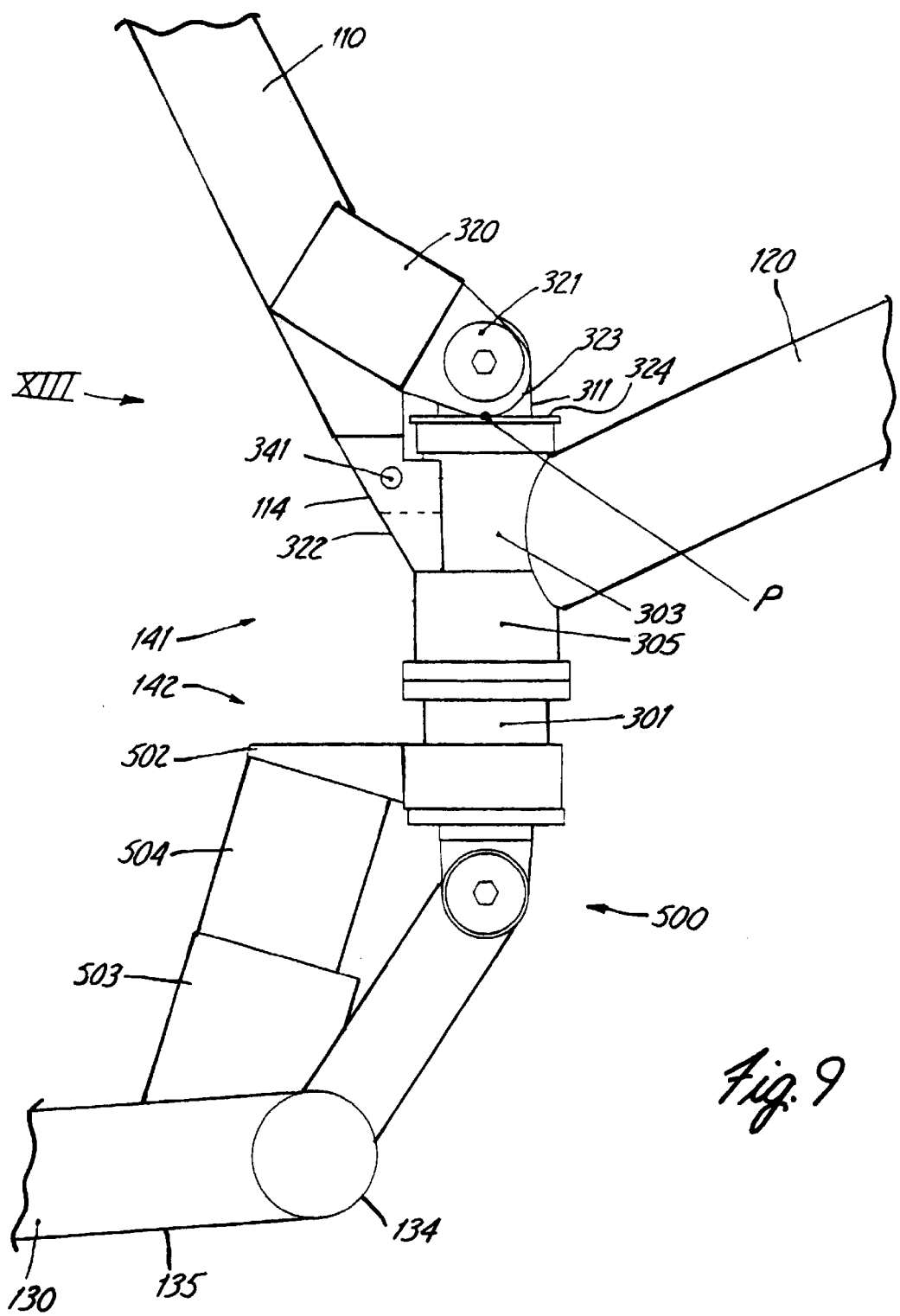
FIG. 9 is a schematic side elevation, to a larger scale, of the central portion of the bicycle frame in the normal operating condition.
Figure 10:
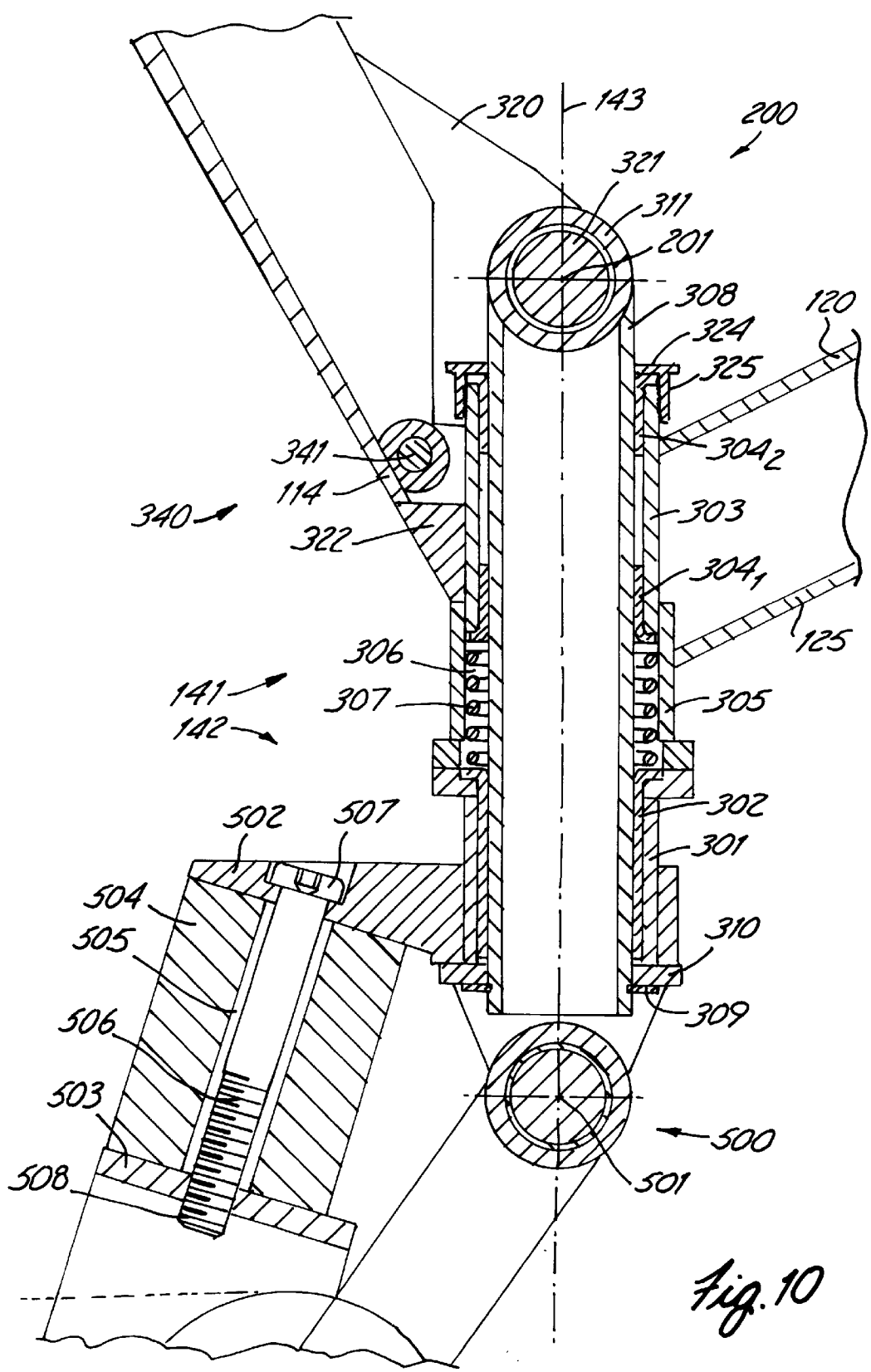
FIG. 10 is a schematic longitudinal section of the central portion of the bicycle frame in the normal operating condition.

FIG. 9 is a simplified side elevation of the central portion of the frame 100 of the bicycle 1, and FIG. 10 shows a longitudinal section of the same portion on a slightly larger scale. It is observed that in FIGS. 9 and 10, the plastic outer parts o the frame 100 have been left out.

Reference numeral 134 designates a bearing bush for the pedals 133, which bearing bush is mounted on the front end of a skeleton tube 135 of the third frame arm 130. Connected to that skeleton tube 135 is a lower cylinder bush 301 which forms part of the lower leg portion 142 and is directed substantially vertically. Preferably, and as shown, a first bronze bearing bush 302 is arranged in the lower cylinder bush 301.

The upper leg portion 141 comprises an upper cylinder bush 303 which is mounted on the skeleton tube 125 of the second frame arm 120. Preferably, and as shown, a second bronze bearing bush $304_1$, $304_2$ is arranged in this upper cylinder bush 303, which second bronze bearing bush in this case consists of two parts. However, these two parts $304_1$, $304_2$ may also be manufactured as an integral whole 304. The two cylinder bushes 301 and 303 are in line, and the internal diameters of the bearing bushes 302 and $304_1$, $304_2$ are mutually identical. As is clearly shown in FIG. 10, the upper cylinder bush 303 has at its lower end a portion 305 whose diameter is larger than the diameter at its upper end, which portion 305 defines a chamber 306 in which a pressure spring 307 is arranged, which pressure spring is precompressed for pressing the two cylinder bushes 301 and 303 axially apart.

Extending within the two cylinder bushes 301 and 303 is a pivot tube 308 whose external diameter corresponds to the internal diameter of the bearing bushes 302 and $304_1$, $304_2$. At its lower end, that pivot tube 308 rests, by means of a locking ring 309, against the lower end of the lower cylinder bush 301 which, in the example shown, mounts a support plate 310. The pivot tube 308, which in the preferred exemplary embodiment shown is hollow but which may also be solid, if so desired, is substantially vertically directed, and its longitudinal axis defines the above-mentioned axis of rotation 143. Mounted at the upper end of the pivot tube 303 is a pivot loop 311, defining the above-mentioned horizontal pivotal axis 201.

Mounted on the saddle arm 110 are pivot flanges 320 which make an angle relative to the longitudinal direction of the saddle arm 110 and which are coupled to the pivot loop 311 by means of a pivot pin 321. Provided at the rear of the upper cylinder bush 303, i.e. opposite the skeleton tube 125 of the second frame arm 120, is a stop support 322. In the normal operating condition of the bicycle 1, in which the saddle arm 110 is upright, the lower end 114 of the saddle arm 110 rests on that stop support 322, as shown in FIG. 10.

As is clearly shown in FIG. 9, the pivot flanges 320 have a curved end edge 323. At its upper end, the upper cylinder bush 303 comprises an annular pressure table 324 enclosing the pivot the 308. As mentioned hereinabove, the upper cylinder bush 303 is pressed upwards relative to the lower cylinder bush 301 by the pressure spring 307, causing the pressure table 324 to be pressed against the curved end edge 323 of the pivot flanges 320. The point of contact in indicated in FIG. 9 by P. When the saddle arm 110 is pivoted forwards about the horizontal pivotal axis 201, from the normal operating condition shown in FIG. 9 into the folded condition (see FIG. 6A), the curved end edge 323 of the pivot flanges 320 slides over the annular pressure table 324, with the point of contact P moving along that end edge 323. The contour of the curved end edge 323 of the pivot flanges 320 is such that the distance from the point of contact P to the horizontal pivotal axis 201 decreases according as the saddle arm 110 pivots further forwards. In one embodiment, that end edge 323 partly has a circular contour, with the center of that circular contour being placed eccentrically relative to the horizontal pivotal axis 201.

Figure 11:
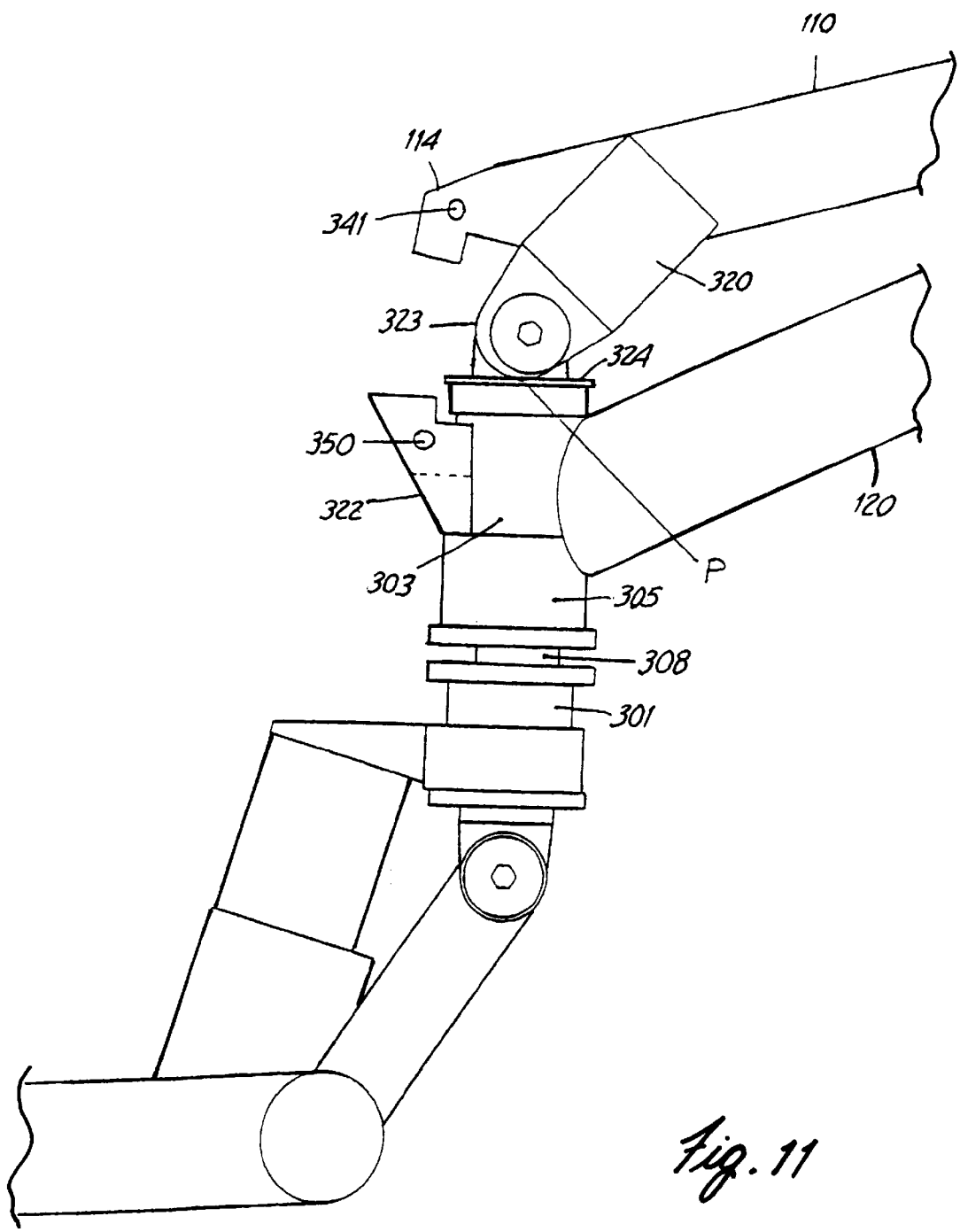
FIG. 11 is a side elevation comparable with FIG. 9 of the central portion of the bicycle frame in the condition in which the saddle arm is pivoted forwards.
Figure 12:
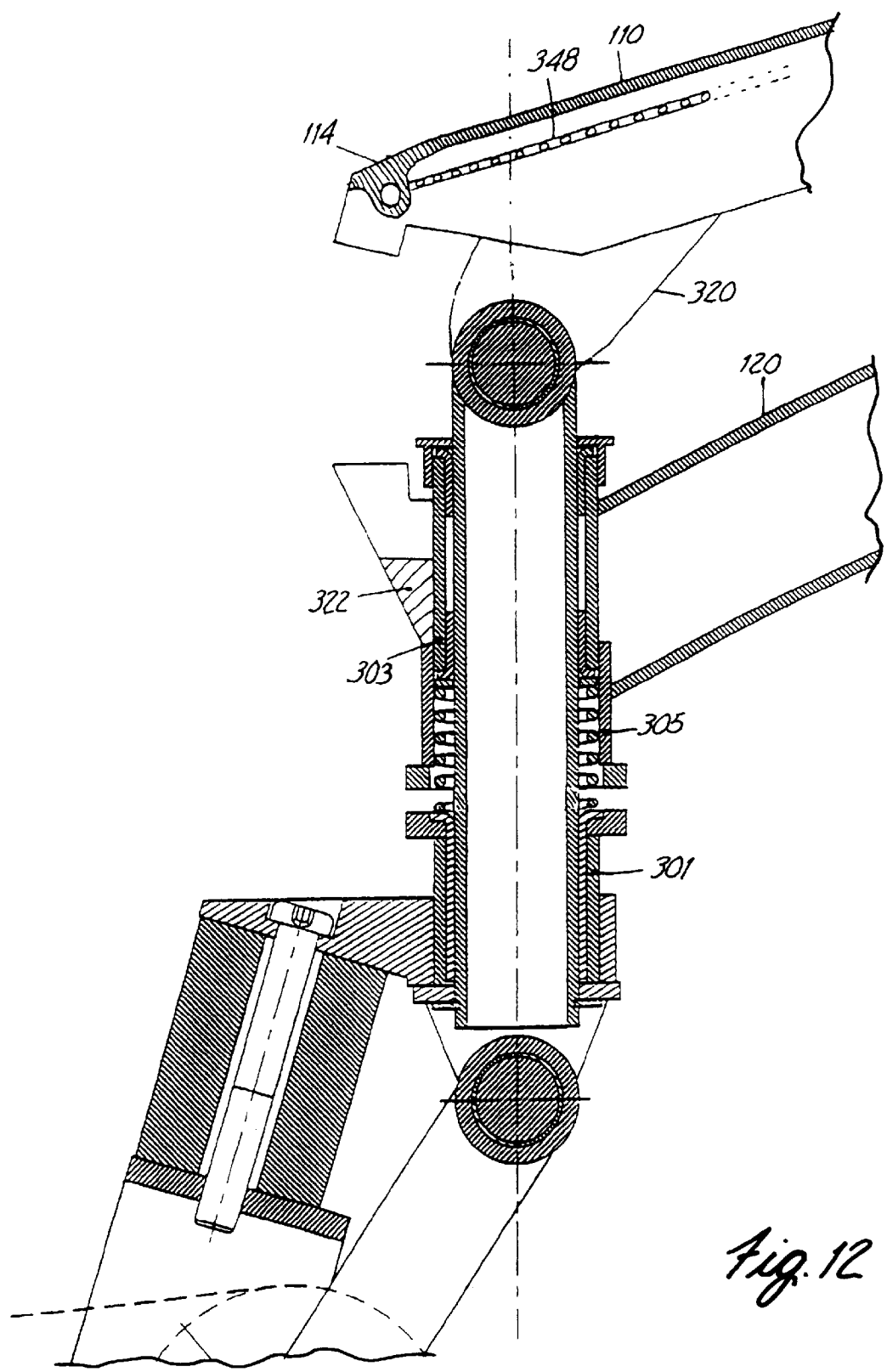
FIG. 12 is a longitudinal section comparable with FIG. 10 of the central portion of the bicycle frame in the condition in which the saddle arm is pivoted forwards.

Thus, when the saddle arm 110 pivots forwards from the normal operating condition into the folding position illustrated in FIG. 6A, the upper cylinder bush 303 is axially pressed upwards relative to the lower cylinder bash 301 by the pressure spring 307, as is clearly illustrated in FIGS. 11 and 12. Conversely, when the saddle arm 110 pivots rearwards from the folding position illustrated in FIG. 6A into the normal operating condition, the upper cylinder bush 303 is axially pressed downwards by the curved end edge 323 of the pivot flanges 320. This axial displacement of the upper cylinder bush 303 relative to the lower cylinder bush 301 causes a rotational locking between the upper cylinder bush 303 and the lower cylinder bush 301 to be removed or engaged respectively. In this manner, when the saddle arm 110 is in the folding position illustrated in FIG. 6A, this rotational locking is removed and the upper cylinder bush 303 and the lower cylinder bush 301 can rotate relative to each other about the pivot tube 308, which is to say that the frame halves 144 and 145 can pivot relative to each other to reach the folding condition illustrated in FIGS. 7 and 8.

When the bicycle is being built up again, the frame halves 144 and 145 are pivoted relative to each other to reach the normal operating condition. Then, the saddle arm 110 is pivoted rearwards, while the rotational locking mentioned is brought into engagement and a pivotal movement of the frame halves 144 and 145 is no longer possible.

It will be understood that in this manner, the operation of pivoting the saddle arm 110 forwards and simultaneously unlocking the frame halves 144 and 145 is particularly simple. Further, it will be understood that the operation of pivoting the saddle arm 110 rearwards and simultaneously locking the frame halves 144 and 145 is particularly simple and accurate.

Figure 13:
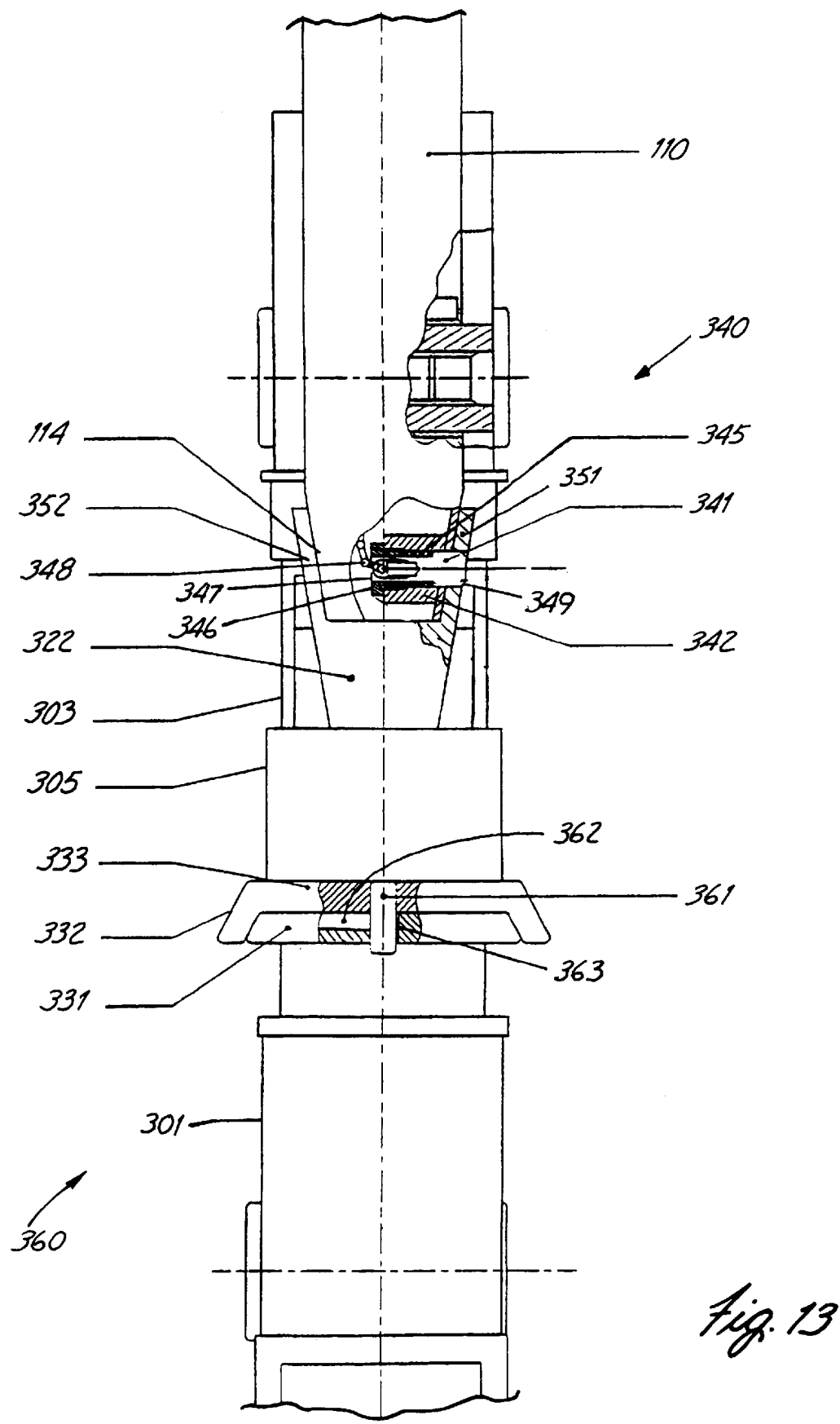
FIG. 13 is a schematic and partially broken-away rear view of the central portion of the bicycle frame, according to the arrow XIII in FIG. 9, to illustrate the pivotal locking of the saddle arm, while also showing a detail of the rotational locking of the frame halves of the bicycle.

This rotational locking can be implemented in various manners. By way of example, the upper cylinder bush 303 may at its lower end be provided with one or more axially directed pins, and the lower cylinder bush 301 may be provided with holes corresponding to those pins, or vice versa. During said axial displacement of the upper cylinder bush 303 and the lower cylinder bush 301 relative to each other, such pins respectively engage or disengage such holes. By way of alternative example, the upper cylinder bush 303 and the lower cylinder bush 301 have mating profiles. FIG. 13 illustrates an example thereof. The lower cylinder bush 301 has its upper end provided with a lower flange 331 having a polygonal contour, preferably a square or rectangular contour. The upper cylinder bush 303 has its lower end provided with an upper flange 333 whose contour corresponds to that of the lower flange 331. Along at least a portion of the circumferential edge of the upper flange 333, in the example shown only along the lateral edges of the upper flange 333, there is provided a downwardly directed skirt, facing the lower cylinder bush 301 and abutting against the outer edge of the lower flange 331.

It is desired that in the unfolded condition of the saddle arm 110 as illustrated in FIGS. 9 and 10, little or no play be present in the rotational coupling means 300, more in particular between the upper cylinder bush 303 and the lower cylinder bush 301. Hence, to allow manufacturing tolerances, there is a need for the possibility of adjusting the axial position of the upper cylinder bush 303 relative to the lower cylinder bush 301 in the unfolded condition. In a preferred embodiment, this possibility is provided in that the annular pressure table 324 is screwed onto the upper cylinder bush 303. As shown in FIG. 10, the annular pressure table 324 has at its lower side a cylindrical skirt 325 whose internal diameter corresponds to the external diameter of the upper cylinder bush 303. That skirt 325 is provided with an internal screw thread corresponding to an external screw thread provided on the upper cylinder bush 303. In this manner, the axial position of the upper cylinder bush 303 relative to the lower cylinder bush 301 can be adjusted by rotating the annular pressure table 324.

If so desired, locking means may be provided for locking the annular pressure table 324 in the desired rotational position relative to the upper cylinder bush 303, but that is not illustrated in the Figures, for the sake of simplicity.

An additional advantage of the construction proposed by the present invention is that the saddle arm 110 can pivot rearwards for reaching the normal operating position of FIG. 2 only if said locking means are aligned relative to each other, i.e. the frame halves 144 and 145 must also be in the normal operating position of FIG. 2. Indeed, if said pins are not in alignment with said holes, or if said profiles do not correspond to each other, the upper cylinder bush 303 and the lower cylinder bush 300 cannot be axially moved towards each other. Accordingly, when the bicycle 1 is being unfolded again, the fact that the saddle arm 110 can pivot rearwards is an indication to the user that the frame halves 144 and 145 are in the proper positions. Conversely, when the bicycle 1 is being folded in, it is not necessary to provide separate retaining means for remaining the saddle arm 110 in its forwardly pivoted position.

In the structural variant shown in FIG. 13, the locking means are self-locating, i.e. they assist in reaching the proper position of the frame halves 144 and 145. Because the skirt 332 of the upper flange 333 makes an angle with the vertical, while the circumferential edge 331 of the lower flange 331 is correspondingly inclined, the upper cylinder bush 303 and the lower cylinder bush 301 can also be moved towards each other if the frame halves 144 and 145 are not exactly in the proper positions. At the same time when the upper cylinder bush 303 and the lower cylinder bush 301 approach each other, the flanges 333 and 331 are constrained into the proper orientations relative to each other, which means that the frame halves 144 and 145 are constrained into their proper positions. Of course, the bicycle 1 comprises locking means 340 whose function is to lock the normal operating position of the saddle arm 110 against pivoting forwards unintentionally, while it must be possible to remove the action of these locking means 340 when the bicycle 1 is to be folded in. In the exemplary embodiment shown, such locking means 340 comprise a locking pin 341 which is associated with said lower end 114 of the saddle arm 110 and which cooperates with said stop support 322. FIG. 13 shows more details of this exemplary embodiment.

Mounted on the lower end 114 of the saddle arm 110 is a locking pin holder 342. This locking pin 341 is provided in a horizontal bore of the locking pin holder 342 so as to be axially slidable. At its upper side, the stop support 322 comprises two upwardly extending support flanges 351 and 352, which in the normal operating position of the saddle arm 110 (FIG. 2) abut on either side against the lower end 114 of the saddle arm 110. In a first one of those support flanges (351), a hole 350 is provided which in the normal operating position of the saddle arm 110 (FIG. .2) is aligned with sail locking pin 341. The locking pin 341 is axially pressed in the direction of the hole 350 in the first support flange 351 by a spring member 345, such as a helical spring, which is likewise arranged in said bore of the locking pin holder 342.

The spring member 345 rests against a closing plug 346 screwed into the bore of the locking, pin holder 342, which closing plug is in turn provided with an axial bore 347. Through that axial bore 347 of the closing plug 346, an operating cable or operating chain 348 extends, having one end thereof attached to the locking pin 341 and the other end thereof to an operating handle which is not illustrated in the Figures for the sake of simplicity. This operating handle is preferably arranges under the saddle 113, at the rear thereof. The operating cable or operating chain 348 is preferably accommodated in a cable duct, also not shown for simplicity's sake, which may be incorporated into a covering of the saddle arm 110, such as the aforementioned PUR-foam.

In the normal operating position, the saddle arm 110 has its lower end 114 resting on the stop support 322, and the locking pin 341 is pressed outside by the spring 345, i.e. rightwards in FIG. 13, with the locking pin 341 extending into the hole 350 in the first support flange 351, whereby the saddle arm, 110 is locked.

When it is desired to pivot the saddle arm 110 forwards, the user operates the operating handle for pulling the operating cable or operating chain 348, whereby the locking pin 341 is pulled into the locking pin holder 342, causing the locking pin 341 to leave the hole 350 in the first support flange 351, as a result of which the saddle arm, 110 is unlocked and can freely pivot forwards. Because of the described preferred position of said operating handle, unlocking the locking pin 341 and pivoting the saddle arm 110 is in fact only one single operation.

When the saddle arm 110 is pivoted rearwards again to reach the normal operating position, that normal operating position is locked again in that the locking pin 341 is pressed again into the hole 350 in the first support flange 351. The construction of the exemplary embodiment shown has the advantage that the operating handle need not be operated for retracting the locking pin 341. The two support flanges 351 and 352 are slightly inclined and thus together have the shape of a truncated letter V, while the lower end 114 of the saddle arm 110 is bevelled correspondingly. When the saddle arm 110 is being pivoted rearwards, the end of the locking pin 341, preferably provided with an oblique or round edge 349, contacts the inner wall of the first support flange 351, causing the locking pin 341 to be automatically pressed into the locking pin holder 342.

As described hereinabove, the frame halves 144 and 145 can pivot relative to each other about the vertical axis 143 when she saddle arm 110 has pivoted forwards. In principle, those halves could pivot in the "wrong direction", i.e in a direction in which the front fork 52 and the third frame arm 130 would contact each other. Preferably, the bicycle 1 comprises means for blocking such pivoting direction. An advantage of such means is that when the bicycle 1 is unfolded again, the user feels a stop when the frame halves 144 and 145 have reached the proper position.

FIG. 13 illustrates a simple example of such means 360 limiting the freedom of rotation. From the lower surface of the upper flange 333, a projection 361 extends downwards; in the example shown, the projection 361 has the shape of a vertical projection 361 mounted in the upper flange 333, preferably by means of screw thread. The Projection 361 engages a hole 363 formed in the lower flange 331. Thus, the combination of projection 361 and hole 363 can act as rotational locking for the frame halves 144 and 145. In the hole 363, a keyway 362 formed in the upper surface of the lower flange 331 ends. The projection 361 has a length such that when the saddle arm 110 is being pivoted forwards and the upper cylinder bush 303 and the lower cylinder bush 301 are axially pressed apart, with the lower flange 331 and the upper flange 333 thus moving apart, the projection 361 still partly extends into the hole 363, but no further than the depth of the keyway 302. The keyway 362 has the shape of an arc of a circle that is centered relative to the axis of rotation 143. In this manner, the keyway 362 can have an arc length of about 180°. During pivoting of the frame halves 144 and 145, the projection 361 moves along the keyway 362 whose length is sufficiently great for the wheels 11 and 21 to be able to meet each other. When the frame halves 144 and 145 are pivoted backwards (unfolding of the bicycle), the projection 361 reaches the end of the keyway 362 when the frame halves 144 and 145 are at least substantially in line, and is then in register with the hole 363.

FIGS. 9 and 10 illustrate a further aspect of the bicycle 1 proposed by the present invention, viz. a built-in springing. Incorporated between the lower cylinder bush 301 and the third frame arm 130 is a knee joint 500 permitting a pivotal movement of the third frame arm 130 relative to the lower cylinder bush 301 about a horizontal pivotal axis 501. Connected to the lower cylinder bush 301 is a first spring support 502, and connected to the third frame arm 130 is a second spring support 503. Between the first spring support 502 and the second spring support 503, a spring member 504 is arranged, for instance a helical spring or a rubber block, with a hole 505 extending therethrough. Through that hole, a bolt 506 passes whose head 507 engages the first spring support 502, and whose screw-threaded end 508 is screwed into a corresponding screw hole of the second spring support 503. This prevents a pivotal movement wherein the third frame arm 130 moves anti-clockwise relative to the lower cylinder bush 301, as viewed in FIG. 10. A pivotal movement in the other direction is in fact possible, wherein said spring member 504 is depressed.

By rotating the bolt 506, the precompression of the spring member 504, and accordingly the "softness" of the springing, can be set.

FIGS. 14–16 show a second advantageous embodiment of a bicycle according to the invention, in which identical parts have identical reference numerals. Only those parts that differ essentially from the parts of the bicycle described with reference to the preceding Figures will presently be specified.

FIGS. 14A–14D show a bicycle 1 according to the invention in four positions corresponding to FIGS. 2, .5, 6A and 8 respectively. in this embodiment, the pivotal axis 55 for the steering system 50 is displaced at an angle relative to a central longitudinal plane of the bicycle in set-up condition. This angle is chosen such that the folding of the steering system 50 involves a swivel movement such that the handlebar 60 will abut against one side of the front wheel 11, as for instance shown in FIG. 14B, without the steering system 50 having to be rotated priorly thereto, for instance about a vertical axis as in the embodiment described earlier. The swivel axis 55 preferably includes an angle of about 45 degrees with said central longitudinal plane and, during use, is preferably approximately horizontal. In addition to simplifying the operations required for folding and unfolding, this moreover has the advantage that a simpler, cheaper and stronger steering device can be obtained. Indeed, means for rotating the steering system relative to the front fork can be omitted.

FIG. 15 is a side elevation of a portion of a frame 100 for a bicycle 1 wherein the frame covering is left out, comprising the first arm 110, the second arm 120 and a portion of the third arm 130, coupled by the rotational means 300. FIGS. 16A and 16B are perspective views of the frame 100 shown in FIG. 15, respectively in the fully unfolded and locked condition and in a partially folded condition. For clarity's sake, the frame arm 135 of the third arm 130 is left out in FIG. 16.

The first arm, the saddle arm 110, comprises two parallel pivot flanges 320, connected via a pivot pin 321 to a pivot loop 311 on the end of a vertically arranged central axis of rotation 308. The axis of rotation 308 is fixedly corrected to the second frame arm 120. The central axis or rotation 308 extends to below the second frame arm 120, the third frame arm 130 being rotatably connected thereto in a manner known to a skilled person. This means that in unlocked condition, the third frame arm 130, and accordingly the first frame half 144, can swivel relative to the second frame half 145 between the position shown in FIGS. 14A–C and the position shown in FIG. 14D, while the saddle arm 110 can swivel about the pivot pin 321 relative to the second arm 120 between the positions shown in FIGS. 16A and 16B.

The directions mentioned in this part of the specifcation are always based upon the normal riding direction or the bicycle, in upright position. Provided on the rear side of the saddle arm 110 is a U-shaped section 601 which extends beyond the lower end of the pivot flanges 320 and which has its open side facing forwards. The rearwardly directed end 602 of the second arm 120 has an end face provided with a first opening 650A. The end 602 has a width chosen such that this end 602 can be fittingly received between the flanges 603 of the U-shaped section 601, when the saddle arm 110 is unfolded (FIG. 16A). Mounted on the rear upper side of the third arm 130 is a tubular section 604, having a position and width such that this section, too, can be fittingly received between the flanges 603 of the U-shaped section 601, when the saddle arm 110 is unfolded (FIG. 16A). This means teat when the saddle arm 110 is unfolded, rotation of the first frame part 144 relative to the second frame part 145 is prevented by the U-shaped sectional part 601 (FIG. 16A), while when the saddle arm 110 is being swivelled away, the third arm 130 and, accordingly, the first frame half 144 can be swivelled around the central axis of rotation 309 (FIG. 16B).

Provided on the rear side of the U-shaped section 601 is a bracket 605 with a swivel axis 606, the swivel axis 606 extending approximately parallel to the pivot pin 321. Pivotally mounted on the swivel axis 606 is a locking arm 607, extending along the section 601. The upper end 608 of the locking arm 607 lies at a distance above the swivel axis, the lower end 609 lies at a distance therebelow. Provided n the U-section 601 is a second opening 650B, which, when the saddle arm 110 is unfolded, at least partially covers the first opening 650A. The lower end 609 of the locking arm 607 comprises a locking projection 641 extending forwards and located next to or partially in the first and/or second opening 650A,B, depending on the position of the frame halves 144, 145 and the saddle arm 110.

FIG. 17 represents three comparable sectional views of the locking means 340 and the parts of the frame 100 that cooperate therewith. In FIG. 17A, the locked position is shown. In that position, the locking projection 641 passes through the second opening 650B in the U-section 601 and into the first opening 650A in the support face 622, formed by the end 602 of the second arm 120. This involves an upper closing face 610 catching below the upper longitudinal edge 611A of the first opening 650A. The position of the locking projection 641 is settable relative to the swivel axis 606 and the opening 650A by screw means 612, shown schematically, such that in each case a proper fit of the locking projection 641 in the opening 650A is obtained. In the position shown in FIG. 17A, a positive locking of the frame halves 144, 145 relative to each other is obtained. Spring means 613 are provided, for instance between the locking arm 607 and the U-section 601, for pretensioning the locking arm in this position. The locking projection 641 has its lower side provided with an inclined run-on face 614 for simplifying the entry of the locking projection 641 into the opening 650A,B.

In FIG. 17B, the locking arm 607 is pivoted against the spring action, by depressing the upper end 608 towards the U-section 601, causing the locking projection 641 to move out of the openings 640A,B. This enables the saddle arm 110 to be tilted forwards, as shown in FIG. 17C. Preferably, the locking projection 641 is received in the openings 650A,B with some closing tension, whereby the locking of the frame halves 144, 145 is even further improved. Since the saddle arm 110 is rearwardly inclined, the saddle arm 110 is moreover always pressed into the unfolded position, thus ensuring the retention of the parts even further. In this embodiment, unfolding of the saddle arm 110 always automatically involves locking of the swivel movement of the saddle arm. Hence, primarily, locking of the swivel movements of the frame halves is obtained by the U-shaped section 601, and secondarily yet simultaneously, locking of the swivel movement of the saddle arm 110 is obtained by the locking projection 641. As a matter of fact, other locking means can of course also be used, such as the above-described screw means, clamping means, magnetic means and combinations thereof. Moreover, lockings of for instance the suitcase-lock type, safety-clasp type and the like can be used.

In FIG. 21, there is provided an alternative embodiment of a locking of the saddle arm 110, wherein two locking projections 641A are provided in the tubular section 604, which locking projections 641A extend in approximately horizontal direction and are movable between a first position in which they are received within the tubular section 604, and a second, blocking position in which they project beyond the sides of the tubular section 604. Provided in the flanges 603 of the U-shaped section 601 are two openings 650C, which can be engaged by the locking projections 641A in the second position. The locking projections 641A are pretensioned in the second position by an intermediate spring means 641B and can be pulled into the first position by means of, for instance, a cable 690. The locking projections 641A have a run-on face 691, providing that when the saddle arm 110 is being unfolded, the locking projections 641A automatically engage the openings 650C, comparable with a lock bolt. The operating cable may or instance extend inside the casing and through the rotational coupling means to a position adjacent the saddle. This simplifies the release of the locking protections 641A. The advantage of such embodiment is moreover chat the operating direction of the locking projections 641A is approximately at right angles to the plane in which the saddle arm 110 is swivelled, which is advantageous in terms of construction and safety.

As appears in particular from FIG. 15, in this embodiment, the front portion 135 of the third arm 130 is constructed as a section, in particular an extrusion section, comprising a chamber 134 for the crank axle, and a second chamber. 134A for positioning an intermediate axle (not shown). Provided on the upper side of the section 135 is a fastening point for a spring member 504, while at the front side, a passage is provided for a swivel axis 501 in the third arm 130. The Ocular section 604 has its lower side provided with an approximately horizontal part 604A to which the spring member 504 can be secured. This enables the chard arm 130 to slightly pivot with spring action relative to, the second arm 120 about the swivel axis 501. The extrusion section 135 may serve as base element for mounting shell parts 130, 132 (not shown), within which the drive means can be accommodated. Drive means, in particular drive means with an intermediate axle, are described in applicant's non-prepublished Dutch patent application NL 1009314, which patent application is considered to the incorporated herein by reference.

The base structure of the first 110, second 120 and third arm 130 is substantially manufactured from sectional parts, for instance steel or aluminum tubular sections. Fixes on these sections are the various parts, such as the locking arm 607, cable lead-through means 615, fasteners for, for instance, a battery for the lighting, electric switch means and the like. Preferably, each arm 110, 120, 130 is separately formed from the other parts and provided with the parts attached thereto. Subsequently, each thus formed arm 110, 120, 130 is placed in a mold and provided with a plastic casing in particular a foamed casing 700 of, for instance, PUR-foam or rubber, schematically shown in FIG. 20 by interrupted lines, for the second arm 120. In this casing, the base structure of the arms 110, 120, 130 is accommodated almost completely. Only those parts remain exposed that either have to be intercoupled or have to be still accessible when the bicycle is finished. Further, prior to the foaming operation, covering means are provided where necessary, for instance over a portion of the locking arm 607, to keep clear sufficient space for movement thereof. As the different parts are prepared separately and assembled only after they have been prepared, important logistic advantages are achieved. Actually, a bicycle according to the present invention can also be manufactured in a conventional manner. The cables of the bicycle, for instance switch cables and brake cables, are substantially laid against the outer side of the tubular sections of the arms 110, 120, 130 and foamed in. This means that the bicycle obtains a smooth outward appearance, at least without the presence of projecting cables and other wires, which moreover has the advantage that no projecting parts are present that, during use, may catch behind anything or could cause damage to the environment or injuries, which is of great importance in particular for a folding bicycle.

The advantage of using foaming techniques or the like for providing a form casing around the larger part of the base structure, is that form changes of the bicycle can be effected in a particularly simple manner. Indeed, starting from the same base structure, different forms can in each case be determined simply by adjusting the foaming molds. This means that an extensive individualization can be carried out while specific customer's wishes can be taken into account, at relatively low costs. Moreover, the finishing of base structure may be relatively rough, which is advantageous in terms of costs. Further, providing the base structure with a casing offers the advantage that the frame 100 may be of a relatively soft design, without strength concession having to be made, while, moreover, the frame will feel warm, which is advantageous in particular when the bicycle is picked up, and the frame may be given a robust outward appearance while it may nevertheless be of a relatively light construction. Also coloring, texture and printing of the bicycle may thus be adjusted more readily It is observed that this manner of casing the base structure may also be advantageously applied to other types of folding bicycles and to ordinary bicycles.

FIGS. 18 and 19 show the coupling 70 for the steering system 50. This coupling comprises a lower coupling part 670 which is mounted on the steering head 123, at least on the stem 51, and an upper coupling part 671 connected thereto via the swivel axis 55, to which upper coupling part the lower end of the steering leg 61 is attached. FIG. 18 shows the coupling means 70 in opened position, i.e. when the steering system 50 is folded down, and FIG. 19 shows the coupling means 70 when the steering system so is set up. The lower coupling part 670 has its lower side provided with a bush 675 which can be fittingly slid into or over a tubular part of the front fork and can be connected thereto in a conventional manner to obtain a rigid connection between the lower coupling part 670 and the front fork, via the stem 51. The lower coupling part 670 is provided with an arcuate slot 670 extending concentrically around a central bore for the stem 51 and enclosing an angle of, for instance, 180 degrees. With the steering system 50 in a "straight ahead" position, the slot 676 is located on the side of the stem 51 facing the rear side of the bicycle, above or preferably around the ends 677 of the cable-guiding elements 615. When these ends 677 lie in the slot 676, the maximal travel of the steering system 50 relative to the second arm 120 is thereby determined.

Extending through the coupling means 70 are various cables 672, 673, 674. These cables are preferably of the Bowden cable-type or cables otherwise provided with an outer guide casing. Instead of cables, lines can be used as well, such as hydraulic lines for use in a hydraulic brake systems. The cables 672, 673, 674 extend through a central opening 679 in the upper coupling part 671 to the handgrips, at least to brake handles, gear handles and the like, on or at least at the handlebar 62, 63. A first cable 672 is a brake cable for the front brake 678. This cable 672 extends through an opening 680 provided adjacent the stem 51 in the lower coupling part 670, through the bush 675 and through or along the front fork, down to the brake 678, protected by the for casing and, possibly, the sectional parts. The second cable 673 is a cable for operating the rear brake 681 (not shown), the third cable 674 is for operating gear means (accommodated in, for instance, the intermediate axle, within the third arm 130. These means are not shown in the drawing). FIG. 19 shows the cable lead-through when the coupling part 70 is closed.

The cables 672, 673, 674 are passed into the handlebar 62 from the top side, with some space, to obtain play for taking up a change of length when the steering system 50 is being folded in.

FIGS. 18 and 19 also show a spring-loaded locking projection 682 with which the coupling means 70 can be locked by enclosing a lip 633 provided on the lower coupling part 670 and a lip 684 provided on the upper coupling part 671. Of course, another type of locking mechanism can of course also be applied, such as a quick-acting closure. It is observed that in an advantageous manner, a coupling member 70A can be provided on the saddle arm 110, for instance at the location of the second part 112 thereof, which coupling member can also cooperate with the locking projection 682, for instance a lip whose shape is at least partially identical to that of the lip 684. The effect thus achieved is that the saddle arm 110 can be locked in the folded position in a simple and elegant manner.

FIG. 20 schematically shows, in cut-through side elevation, how the second and third cables 673, 674 are led through. From the coupling means 70 (not shown in FIG. 20), the two cables 673, 674 extend through the cable-guiding elements 615 and along the upper side of the second arm 120. The central axis of rotation 308 is hollow and provided with a frontal opening 683 adjacent its upper end, below the pivot loop 311. The cables 673, 674 are passed through this opening 683 and through the central axis of rotation 305, such that they can be passed into or at least to the third arm 130. In an identical or comparable manner, other cables and lines can of course be led through as well. The cables, lines and the like are at least largely surrounded by the form casing. This lead-through offers the advantage that folding and unfolding of the bicycle can take place without the danger of cables or lines being cut off or damaged otherwise, while the bicycle is directly ready for use when unfolded. Moreover, inner cables can readily be replaced.

In a particular embodiment, there is arranged in the third arm 130, in particular in the second chamber 134A, a drive unit for direct drive of the bicycle, or for supporting the drive. This drive unit can for instance be an electromotor, included instead of or at the intermediate axle. Preferably, a battery is arranged in the second 120 or third arm 130, which battery provides the drive mechanism with current and which, when other drive means such as the pedal device are used, is charged, with the motor acting as dynamo. In an advantageous embodiment, a removable panel 120A is provided on the top side of the second arm 120, under which panel a storage space is provided. In this space, the above battery can for instance be accommodated, supported by the base section.

In this manner, the present invention provides a bicycle which, by means of very few operations that are moreover relatively simple, can be folded into a particularly compact package. The first two operations concern the unlocking of the handlebar 60 and folding aside the handlebar 60 (see FIG. 5); a separate securing operation for the handlebar 60 is not necessary, because the handlebar 60 is retained in this position by, for instance, the magnet 56 mentioned. The third operation concerns the unlocking of the saddle arm 110, pivoting the saddle arm 110 forwards, and unlocking the frame leg 140. The fourth operation concerns the pivoting of the two frame halves 144, 145 about the axis of rotation 143. A separate securing operation for these two frame halves 144, 145 is not necessary, because the clamping means at the free ends of the wheel axles 11 and 21 engage each other automatically.

Optionally, the pedals 133 may further be folded in, if it is desired to store the folded bicycle 1 in a fairly small storage space such as a trunk of a car or a luggage rack of a train.

It will be readily understood by anyone skilled in the art that the protective scope of the present invention as defined by the claims is not limited to the embodiments shown in the drawings and discussed, but that it is possible to change or modify the embodiments shown of the foldable bicycle according to the invention within the framework of the inventive concept. In particular, parts of the bicycle may be constructed in a conventional manner, such as a conventional steering coupling, a conventional frame without foam covering, or a conventional wheel suspension.

What is claimed is:

1. A foldable bicycle, comprising:
   a frame subdivided into two frame halves; a first frame half of the frame comprising a saddle arm with a saddle which can be mounted on one end thereof, and a second frame arm having a steering head mounted on one end thereof;
   frame-coupling means intercoupling the two frame halves, enabling said two frame halves to pivot relative to each other about a substantially vertical pivotal axis; and
   frame-locking means for locking the frame-coupling means in an unfolded condition of the bicycle;
   characterized in that:
   the saddle arm and the second frame arm are pivotally interconnected by pivot means whose pivotal axis is substantially horizontally directed, perpendicularly to the longitudinal direction of the bicycle;
   saddle arm-locking means are provided for locking the pivot means in an unfolded condition of the bicycle;
   and that said frame-locking means are coupled to the saddle arm such that a forwardly directed pivotal movement of the saddle arm removes the locking action of the frame-locking means to allow a pivotal movement of the frame-coupling means.

2. A bicycle according to claim 1, wherein the frame-coupling means comprise a substantially vertically directed pivot tube having a circular-cylindrical outer contour whose center line defines said pivotal axis; wherein the second frame half comprises a lower cylinder bush which is connected to the third frame arm and an inter contour of which corresponds to the outer contour of the pivot tube, and which has a freedom of rotation relative to the pivot tube;
   wherein the frame-locking means act between the lower cylinder bush and the upper cylinder bush, wherein the locking action depends on the mutual axial position of the lower cylinder bush and the upper cylinder bush.

3. A bicycle according to claim 2, wherein the lower end of the upper cylinder bush has a great diameter that the pivot tube, wherein the chamber is defined between the pivot tube and said lower end of the upper cylinder bush, and wherein a sprig member is arranged in said chamber, said spring member exerting an axial pressure force on the lower cylinder bush and the upper cylinder bush for pressure the lower cylinder bush and the upper cylinder bush axially apart.

4. A bicycle according to claim 3, wherein a pivot flange of the saddle arm is pivotally connected to the upper end of the pivot tube; wherein a curved end edge of said pivot flange, preferably with the interposition of an annular pressure table, is in touch with the upper end of the upper cylinder bush; and wherein said curved end edge has a contour such that a forward pivotal movement of the saddle arm results in an axially upwardly directed displacement of the upper cylinder bush.

5. A bicycle according to claim 4, wherein the annular pressure table is screwed onto the upper end of the upper cylinder bush.

6. A bicycle according to claim 5, wherein the interacting ends of the upper cylinder bush and the lower cylinder bush in the normal operating condition of the bicycle prevent a rotation of the upper cylinder bush and the lower cylinder bush relative to each other.

7. A bicycle according to claim 6, wherein means are provided which prevent the frame halves from pivoting in an undesired direction.

8. A bicycle according to claim 1, wherein a stop support for the lower end of the saddle and is mounted on the upper cylinder bush, and wherein the saddle arm-locking means comprise a locking pin which is attached to the lower end of the saddle arm for axial displacement, and a locking hole formed in support flange which is rigidly fixed relative to the upper cylinder bush.

9. A bicycle according to claim 8, wherein the locking pin is pressed into said locking hole by a spring member, and wherein an operating chain or able is provided, attached to the locking pin, for pulling the locking pin from said locking hole against the action of the spring member.

10. A bicycle according to claim 9, wherein an operating handle for the operating chain or cable is provided under the saddle.

11. A bicycle according to claim 1, wherein a steering system is rotatably mounted in the steering head, said steering system comprising a stem extending through the steering head, a from fork mounted on a lower end of the stem with a front wheel which can be mounted on one end of said front fork, and a handlebar mounted on an upper end of the stem;
   wherein the handle bar is pivotally coupled to the stem, wherein handlebar-looking means are provided for locking the handlebar in an unfolded condition of the bicycle;
   wherein the handlebar in a folded condition extends along the steering head and the front fork.

12. A bicycle according to claim 1, wherein, in the folded condition of the saddle arm, the saddle arm is directed substantially parallel to the second frame arm, while the saddle is then directed downwards in front of the steering head.

13. A bicycle according to claim 1, wherein the saddle arm has a U-shaped cross section at least over a part of its length, wherein the upper side of the second frame arm has a contour corresponding to the inside of the U-shaped cross section of the saddle arm, and wherein, in the folded condition of the saddle arm, the U-shaped of the saddle arm embraces the upper side of the second frame arm.

14. A bicycle according to claim 1, wherein the front fork only has a single leg, and wherein the axle of the front wheel has only one end thereof bearing-mounted in the single leg of the front fork;
   wherein a second frame half of the frame comprises a third frame arm with a rear wheel which can be mounted on one end thereof, wherein the axle of the rear wheel has only one end thereof bearing-mounted in the third frame arm.

15. A bicycle according to claim 14, wherein clamping means are provided for retaining e frame halves in the folded condition, said clamping means being arranged on the free ends of the axles of the wheels.

16. A bicycle according to claim 1, wherein between the lower cylinder bush and the third frame arm, a knee joint is included, permitting a pivotal movement of the third frame arm relative to the lower cylinder bush about a horizontal pivotal axis; and wherein a spring member is coupled between the lower cylinder bush and the third frame arm.

17. A bicycle according to claim 1, wherein the frame is at least partially surrounded by a form casing in particular a form casing substantially manufactured by foaming, preferably from PUR foam or rubber.

18. A bicycle according to claim 17, wherein cables of the bicycle are substantially surrounded by the form casing.

19. A bicycle according to claim 1, wherein the saddle arm comprises a projecting part capable of engaging in or over a part of at least the second arm and the third arm for locking the first frame half relative to the second frame half against rotation.

20. A bicycle according to claim 1, wherein a motor is provided for driving the bicycle or supporting the drive thereof, said motor being accommodated in the third frame arm.

21. A bicycle according to claim 1, wherein at least a portion of the third arm is an extrusion section whose extrusion direction, during normal operating position of the bicycle, extends approximately at right angles to the main plane of the frame, approximately parallel to the rear axle of the bicycle.

22. A bicycle according to claim 1, wherein the steering system is pivotable about an axis extending under an angle with a central longitudinal plane of the bicycle, such that the steering system can be pivoted from an operating position into a folded position in which the handlebar extends approximately next to the front wheel in a plane approximately parallel to the main plane of the bicycle.

23. A bicycle according to claim 1, wherein by means of a first coupling part, the steering system is connected to a second coupling part via a pivotal axis, wherein the second coupling part is mounted on the front fork and wherein a number of cables extend from within the steering system through the first and the second coupling part along the pivotal axis to the from fork or the second frame arm respectively.

24. A method for manufacturing a bicycle comprising:
manufacturing a saddle arm;
manufacturing a second frame arm independently of the saddle arm, the second frame arm having a steering head mounted on one end thereof; and
manufacturing a third frame arm, comprising at least drive means for the bicycle, the third frame arm being manufactured independently of the saddle arm and the second frame arm;
forming a form casing over at least a part of the saddle arm, second arm and/or third arm in a mold by means of PUR or rubber or a plastic, whereupon the form casing rotationally intercouples the saddle arm, the second frame arm and the third frame arm.

* * * * *

UNITED STATES PATENT AND TRADEMARK OFFICE
CERTIFICATE OF CORRECTION

PATENT NO. : 6,267,401 B1
DATED : July 31, 2001
INVENTOR(S) : Dirk-Koen De Jong

It is certified that error appears in the above-identified patent and that said Letters Patent is hereby corrected as shown below:

Column 1,
Line 29, begin new paragraph after "closure."

Column 2,
Line 4, delete "cache", insert -- of the --
Line 11, delete "co", insert -- to --
Line 34, delete "B#B", insert -- B-B --

Column 3,
Line 40, after "invention" insert -- , --

Column 4,
Line 35, delete "comprises", insert -- comprise --
Line 44, after possible insert -- in --
Line 60, delete "43", insert -- 4B --

Column 5,
Line 5, after "FIG. 2," delete "."
Line 14, delete "63", insert -- 6B --

Column 6,
Line 5, delete "120", insert -- 130 --
Line 31, delete "so", insert -- of --
Line 45, delete "1", insert -- 11 --

Column 7,
Line 29, delete "10", insert -- 110 --
Line 36, delete "o", insert -- of --

UNITED STATES PATENT AND TRADEMARK OFFICE
CERTIFICATE OF CORRECTION

PATENT NO.      : 6,267,401 B1
DATED           : July 31, 2001
INVENTOR(S)     : Dirk-Koen De Jong It is certified that error appears in the above-identified patent and that said Letters Patent is hereby corrected as shown below:

Column 8,
Line 4, delete "303", insert -- 308 --

Column 9,
Line 53, delete "300", insert -- 301 --
Line 59, delete "remaining", insert -- retaining --

Column 10,
Line 7, after "positions.", begin new paragraph
Line 27, delete "sail", insert -- said --
Line 40, delete "arranges", insert -- arranged --
Line 56, after "arm" delete ","

Column 11,
Line 35, delete "302", insert -- 362 --

Column 12,
Line 64, delete "teat", insert -- that --

Column 13,
Line 2, delete "309", insert -- 308 --
Line 10, delete "n", insert -- in --

UNITED STATES PATENT AND TRADEMARK OFFICE
CERTIFICATE OF CORRECTION

PATENT NO. : 6,267,401 B1
DATED : July 31, 2001
INVENTOR(S) : Dirk-Koen De Jong

It is certified that error appears in the above-identified patent and that said Letters Patent is hereby corrected as shown below:

Column 14,
Line 12, delete "or", insert -- for --
Line 15, delete "protection", insert -- projections --
Line 16, delete "chat", insert -- that --
Line 28, delete "Ocular", insert -- tubular --
Line 30, delete "chard", insert -- third --
Line 31, after "relative to," delete ","
Line 38, delete "the", insert -- be --
Line 42, delete "Fixes", insert -- Fixed --

Column 15,
Line 37, delete "so", insert -- 50 --
Line 44, delete "670", insert -- 676 --
Line 66, delete "for", insert -- form --

Column 16,
Line 12, delete "633", insert -- 683 --
Line 15, delete "of course"
Line 33, delete "305", insert -- 308 --

Column 17,
Line 58, delete "great", insert -- greater -- and delete "that", insert -- than --
Line 61, delete "sprig", insert -- spring --
Line 63, delete "pressure", insert -- pressing --

UNITED STATES PATENT AND TRADEMARK OFFICE
CERTIFICATE OF CORRECTION

PATENT NO.   : 6,267,401 B1
DATED        : July 31, 2001
INVENTOR(S)  : Dirk-Koen De Jong It is certified that error appears in the above-identified patent and that said Letters Patent is hereby corrected as shown below:

<u>Column 18,</u>
Line 4, after "formed in" insert -- a --
Line 20, delete "and", insert -- arm --
Line 28, delete "able", insert -- cable --
Line 41, delete "handle bar", insert -- handlebar --
Line 42, delete "handlebar-looking", insert -- handlebar-locking --

<u>Column 19,</u>
Line 2, delete "e", insert -- the --

<u>Column 20,</u>
Line 14, delete "from", insert -- front --

Signed and Sealed this

Eighteenth Day of June, 2002

*Attest:*

JAMES E. ROGAN
*Attesting Officer*       *Director of the United States Patent and Trademark Office*